US010717912B2

(12) United States Patent
Zhou et al.

(10) Patent No.: US 10,717,912 B2
(45) Date of Patent: Jul. 21, 2020

(54) DRILLING FLUID COMPOSITION INCLUDING VISCOSIFIER AND METHOD OF USING THE SAME

(71) Applicant: Halliburton Energy Services, Inc., Houston, TX (US)

(72) Inventors: Hui Zhou, The Woodlands, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 337 days.

(21) Appl. No.: 14/897,780

(22) PCT Filed: Sep. 20, 2013

(86) PCT No.: PCT/US2013/060909
§ 371 (c)(1),
(2) Date: Dec. 11, 2015

(87) PCT Pub. No.: WO2015/041679
PCT Pub. Date: Mar. 26, 2015

(65) Prior Publication Data
US 2016/0122613 A1 May 5, 2016

(51) Int. Cl.
*C09K 8/34* (2006.01)
*C09K 8/502* (2006.01)
(Continued)

(52) U.S. Cl.
CPC ............... *C09K 8/035* (2013.01); *C09K 8/12* (2013.01); *C09K 8/34* (2013.01); *C09K 8/502* (2013.01); *C09K 8/5083* (2013.01); *C09K 8/512* (2013.01); *C09K 8/528* (2013.01); *E21B 21/003* (2013.01); *C09K 2208/08* (2013.01); (Continued)

(58) Field of Classification Search
USPC ........................................................... 175/65
See application file for complete search history.

(56) References Cited

U.S. PATENT DOCUMENTS 4,349,443 A 9/1982 Block
4,353,804 A 10/1982 Green et al.
(Continued)

FOREIGN PATENT DOCUMENTS

EP 0186663 B1 5/1995
WO WO-2015041679 A1 3/2015

OTHER PUBLICATIONS

"International Application Serial No. PCT/US2013/060909, International Search Report dated Jun. 24, 2014", 3 pgs.
(Continued)

*Primary Examiner* — Zakiya W Bates
*Assistant Examiner* — Ashish K Varma
(74) *Attorney, Agent, or Firm* — Tenley Krueger; C. Tumey Law Group PLLC

(57) ABSTRACT

The present invention relates to drilling fluid compositions and methods of using the same. In various embodiments, the present invention provides a method of treating a subterranean formation including obtaining or providing a drilling fluid composition including a viscosifier including at least one of a poly(vinyl alcohol) copolymer, a crosslinked poly (vinyl alcohol), and a crosslinked poly(vinyl alcohol) copolymer. The method also includes placing the composition in a subterranean formation.

19 Claims, 1 Drawing Sheet

(51) Int. Cl.
*C09K 8/035* (2006.01)
*C09K 8/512* (2006.01)
*C09K 8/508* (2006.01)
*C09K 8/528* (2006.01)
*C09K 8/12* (2006.01)
*E21B 21/00* (2006.01)

(52) U.S. Cl.
CPC ...... *C09K 2208/18* (2013.01); *C09K 2208/24* (2013.01); *C09K 2208/26* (2013.01)

(56) References Cited

U.S. PATENT DOCUMENTS

| | | | |
|---|---|---|---|
| 4,389,319 A * | 6/1983 | Block | E21B 21/003 507/114 |
| 4,411,800 A | 10/1983 | Green et al. | |
| 4,428,845 A | 1/1984 | Block | |
| 4,458,048 A | 7/1984 | Schmitt | |
| 4,458,052 A | 7/1984 | Schmitt | |
| 4,472,552 A | 9/1984 | Blouin | |
| 4,473,480 A | 9/1984 | Green et al. | |
| 31,748 A | 11/1984 | Block | |
| 4,486,318 A | 12/1984 | Green | |
| 4,529,522 A * | 7/1985 | Schmitt | C09K 8/588 166/275 |
| 4,541,485 A | 9/1985 | Block | |
| 4,545,911 A | 10/1985 | Schmitt | |
| 4,547,297 A | 10/1985 | Block | |
| 4,643,255 A | 2/1987 | Sandiford et al. | |
| 4,859,717 A | 8/1989 | Hoskin et al. | |
| 4,940,090 A * | 7/1990 | Hoskin | C09K 8/512 166/270 |
| 7,815,731 B2 | 10/2010 | Beckman | |

OTHER PUBLICATIONS

"International Application Serial No. PCT/US2013/060909, Written Opinion dated Jun. 24, 2014", 21 pgs.

Ivanov, A. E, et al., "Synthesis of boronate-containing copolymers of N,N-dimethylacrylamide, their interaction with poly(vinyl alcohol) and rheological behaviour of the gels", Polymer, 45(8), (Apr. 2004), 2495-2505.

Schexnailder, Patrick, et al., "Nanocomposite polymer hydrogels", Colloid and Polymer Science, 287(1), (Jan. 2009), 1-11.

* cited by examiner

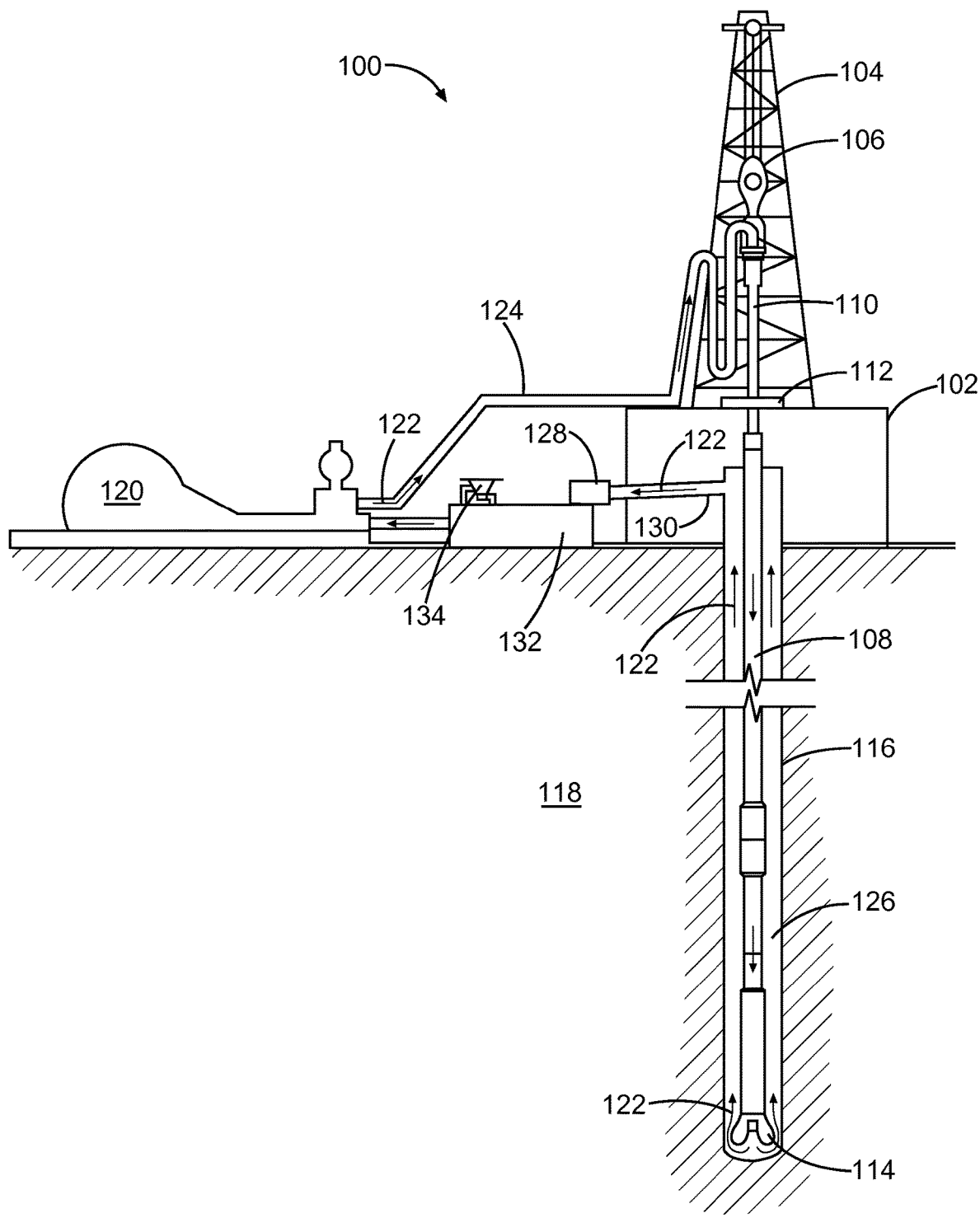

DRILLING FLUID COMPOSITION INCLUDING VISCOSIFIER AND METHOD OF USING THE SAME

PRIORITY APPLICATION

This application is a U.S. National Stage Filing under 35 U.S.C. 371 from International Application No. PCT/US2013/060909, filed Sep. 20, 2013; and published as WO 2015/041679 on Mar. 26, 2015; which application and publication are incorporated herein by reference in their entirety.

BACKGROUND OF THE INVENTION

During a well drilling operation, drilling fluids are circulated down the wellbore being drilled. The drilling fluid is generally pumped down the inside of the drillpipe and then passes through the drill bit into the wellbore. The fluid returns to the surface through the annulus, where it can then be recovered, processed, and reused. Drilling fluids perform a number of important duties during a drilling operation, such as lubricating and cooling the drill bit and removing generated rock cuttings. Maintaining sufficiently high viscosities of drilling fluids to provide effective suspension and removal of cuttings, and to provide effective fluid loss control, can be challenging, especially under high temperature conditions that can be experienced downhole.

SUMMARY OF THE INVENTION

In various embodiments, the present invention provides a method of treating a subterranean formation. The method includes obtaining or providing a drilling fluid composition. The drilling fluid composition includes a viscosifier. The viscosifier includes at least one of a poly(vinyl alcohol) copolymer, a crosslinked poly(vinyl alcohol), and a crosslinked poly(vinyl alcohol) copolymer. The method also includes placing the composition in a subterranean formation downhole.

In various embodiments, the present invention provides a method of treating a subterranean formation. The method includes obtaining or providing a drilling fluid composition including a viscosifier including at least one of a poly(vinyl alcohol) copolymer, a crosslinked poly(vinyl alcohol), and a crosslinked poly(vinyl alcohol) copolymer. The drilling fluid composition is substantially free of material that is at least one of kaolinite, halloysite, montmorillonite, illite, attapulgite, sepiolite, bentonite, hydrates thereof, and mixtures thereof. The material that the composition is substantially free of is also substantially insoluble in the drilling composition. The material that the composition is substantially free of also substantially has a particle size smaller than 20 mesh and larger than 325 mesh. The drilling fluid is substantially free of Al(O)OH and hydrates thereof. The method also includes placing the composition in a subterranean formation downhole.

In various embodiments, the present invention provides a method of treating a subterranean formation. The method includes obtaining or providing a drilling fluid composition including a viscosifier. The viscosifier includes at least one of a crosslinked poly(vinyl alcohol), and a crosslinked poly(vinyl alcohol) copolymer. The poly(vinyl alcohol) copolymer or the crosslinked poly(vinyl alcohol) copolymer is at least one of a graft, linear, branched, block, and random copolymer. The crosslinked poly(vinyl alcohol) copolymer is a poly(vinyl alcohol)-poly(acrylamide) copolymer, a poly(vinyl alcohol)-poly(2-acrylamido-2-methylpropanesulfonic acid) copolymer, a poly(vinyl alcohol)-poly(N-vinylpyrrolidone) copolymer, a poly(vinyl alcohol)-poly(methylenebisacrylamide) copolymer, a poly(vinyl alcohol)-poly(pentaerythritol allyl ether) copolymer, or a poly(vinyl alcohol)-poly(divinylbenzene) copolymer. The method includes placing the composition in a subterranean formation downhole.

In various embodiments, the present invention provides a system including a drilling fluid composition. The drilling fluid composition includes a viscosifier including at least one of a poly(vinyl alcohol) copolymer, a crosslinked poly(vinyl alcohol), and a crosslinked poly(vinyl alcohol) copolymer. The system also includes a subterranean formation including the composition therein.

In various embodiments, the present invention provides a drilling fluid composition for treatment of a subterranean formation. The drilling fluid composition includes a viscosifier. The viscosifier includes at least one of a poly(vinyl alcohol) copolymer, a crosslinked poly(vinyl alcohol), and a crosslinked poly(vinyl alcohol) copolymer.

In various embodiments, the present invention provides a method of preparing a drilling fluid composition for treatment of a subterranean formation. The method includes forming a drilling fluid composition including a viscosifier. The viscosifier includes at least one of a poly(vinyl alcohol) copolymer, a crosslinked poly(vinyl alcohol), and a crosslinked poly(vinyl alcohol) copolymer.

In various embodiments, the present invention provides certain advantages over other drilling fluid compositions and methods of using the same, at least some of which are unexpected. In some embodiments, the drilling fluid composition can have a higher viscosity at high salt concentrations of the aqueous component of the drilling fluid composition, such as heavy brines and solutions having high concentrations of $CaCl_2$ and $CaBr_2$, as compared to other drilling fluid compositions, such as drilling fluid compositions having ionic polymer thickeners therein. In some embodiments, the ability of the drilling fluid to provide high viscosity when formed with aqueous components having high salt concentrations allows an effective drilling fluid to be formed using more readily accessible sources of water than other drilling fluids, such as sea water, brackish water, brine, flowback water, and the like.

In some embodiments, the drilling fluid composition can have a higher viscosity at low shear rates than other drilling fluid compositions, such as compared to drilling fluid compositions not including poly(vinyl alcohol) copolymers, or such as compared to drilling fluid compositions including linear polymers (e.g., linear poly(vinyl alcohol) polymers) but not including crosslinked polymers such as crosslinked poly(vinyl alcohol) or crosslinked poly(vinyl alcohol) copolymers. In some embodiments, the property of higher viscosity at lower shear rates can make the drilling fluid composition more efficient and effective for suspending and maintaining suspensions of materials such as cuttings compared to other drilling fluid compositions. In some embodiments, the drilling fluid composition can have better fluid loss control than other drilling fluid compositions, such as compared to drilling fluid compositions not including poly(vinyl alcohol) copolymers, or such as compared to drilling fluid compositions including linear polymers (e.g., linear poly(vinyl alcohol) polymers) but not including crosslinked polymers such as crosslinked poly(vinyl alcohol) or crosslinked poly(vinyl alcohol) copolymers.

In some embodiments, the drilling fluid composition can have a higher viscosity at high temperatures than other drilling fluid compositions, such as drilling fluid compositions including polysaccharide thickeners or amide- or ester-based synthetic polymer thickeners. In some embodiments, the property of higher viscosity at higher temperatures can make the drilling fluid composition more useful for high temperature drilling operations and can help to control fluid loss. In some embodiments, the drilling fluid composition can have a higher viscosity with at least two of lower shear rates, higher temperatures, and higher salt concentrations in the aqueous component of the drilling fluid, than other drilling fluid compositions. In contrast to other drilling fluid compositions, various embodiments of the drilling fluid composition can have suitably high viscosities without the presence of hydroxyl-containing aluminum compounds, or without the presence of silicate or alumino-silicate compounds, such as silicate or alumino-silicate compounds insoluble in the drilling fluid and having a mesh size substantially between 20 and 325, such as suitably high viscosities and good fluid loss control characteristics under at least one of high salt concentration, high temperature, and low shear.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 1 illustrates a drilling assembly, in accordance with various embodiments.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750, 000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as alkoxy groups, aryloxy groups, aralkyloxy groups, oxo(carbonyl) groups, carboxyl groups including carboxylic acids, carboxylates, and carboxylate esters; a sulfur-containing group such as alkyl and aryl sulfide groups; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule, or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O(oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O) OR, N(R)C(O)R, N(R)C(S)R, N(R)C(O)N(R)$_2$, N(R)C(S)N (R)$_2$, N(COR)COR, N(OR)R, C(=NH)N(R)$_2$, C(O)N(OR) R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neo-pentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH (CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing 3 or more ring members, of which, one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The terms "halo," "halogen," or "halide," as used herein, by themselves or as part of another substituent mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit, and can include copolymers.

The term "copolymer" as used herein refers to a polymer that includes at least two different monomers, such as graft, linear, branched, block, and random copolymers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore; placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

Method of Treating a Subterranean Formation

In some embodiments, the present invention provides a method of treating a subterranean formation. The method includes obtaining or providing a drilling fluid composition including a viscosifier including at least one of a poly(vinyl alcohol) copolymer, a crosslinked poly(vinyl alcohol) (a crosslinked poly(vinyl alcohol) homopolymer), and a crosslinked poly(vinyl alcohol) copolymer. The drilling fluid composition, or drilling mud or simply "mud," can include any suitable drilling fluid. The drilling fluid can form any suitable proportion of the drilling fluid composition, such about 50 wt % to about 99.999 wt %, about 70 wt % to about 99 wt %, or about 30 wt % or less, 35 wt %, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more. A drilling fluid, also known as a drilling mud, is a specially designed fluid that is circulated through a wellbore as the wellbore is being drilled to facilitate the drilling operation. The drilling fluid can be water-based or oil-based, or any suitable combination of water and oil phases, such as in an emulsion. The drilling fluid can be used to carry cuttings up from beneath and around the bit, transport them up the annulus, and allow their separation. Also, the drilling fluid can cool and lubricate the drill head as well as reduce friction between the drill string and the sides of the hole. The drilling fluid can aid in support of the drill pipe and drill head, and can provide a hydrostatic head to maintain the integrity of the wellbore walls and prevent well blowouts. Specific drilling fluids can be selected to optimize a drilling operation in accordance with the characteristics of a particular geological formation. The drilling fluid can be formulated to prevent unwanted influxes of formation fluids from permeable rocks penetrated and also to form a thin, low-permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g. barium sulfate), surfactants (e.g. betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g. silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments, the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 (5$^{th}$ ed. 1988). An oil-based or invert emulsion-based drilling fluid can include between about 10:90 to about 95:5 by volume, or about 50:50 to about 95:5, of oil phase to water phase. A substantially all oil mud includes about 100% liquid phase oil by volume (e.g., substantially no internal aqueous phase).

The obtaining or providing of the drilling fluid composition can occur at any suitable time and at any suitable location. The obtaining or providing of the drilling fluid composition can occur above-surface. The obtaining or providing of the drilling fluid composition can occur downhole. The method also includes placing the drilling fluid composition in a subterranean formation. The placing of the drilling fluid composition in the subterranean formation can include contacting the drilling fluid composition and any suitable part of the subterranean formation, or contacting the drilling fluid composition and a subterranean material downhole, such as any suitable subterranean material. The subterranean formation can be any suitable subterranean formation. The placing of the drilling fluid composition in the subterranean formation can be any suitable placing and can include any suitable contacting between the subterranean formation and the drilling fluid composition. In various embodiments, at least one of prior to, during, and after the placing of the drilling fluid composition in the subterranean formation, the drilling fluid composition is used downhole, at least one of alone and in combination with other materials, to perform a subterranean drilling operation in the subterranean formation, such as using as a drilling fluid.

The drilling fluid composition can include any suitable solvent therein. In some embodiments, the drilling fluid composition can include at least one of an oil and an organic solvent. The drilling fluid composition can include water. The water in the drilling fluid composition can be any suitable water (for example, an aqueous liquid that is at least one of brine, sea water, brackish water, flow back water, or production water). The water in the drilling fluid composition can be an aqueous liquid including at least one salt, at least one ion, or a combination thereof, dissolved therein. In various embodiments, about 20 wt % to about 99.999,999 wt % of the drilling fluid composition includes the aqueous liquid, or about 50 wt % to about 99 wt %, or about 20 wt % or less, or about 25 wt %, 30, 35, 40, 45, 50, 55, 60, 65, 70, 75, 80, 85, 90, 95, 96, 97, 98, 99, 99.9, 99.99, 99.999, 99.999,9, 99.999,99, or about 99.999,999 wt % or more.

The aqueous liquid can have any suitable salinity. In some embodiments, the aqueous liquid or the drilling fluid composition can have a salt concentration of about 0.000,000,1 g/L to about 250 g/L, or about 10 g/L to about 250 g/L, or about 0.000,000,1 g/L or less, or about 0.000,001 g/L, 0.000,01, 0.000,1, 0.001, 0.01, 0.1, 1, 5, 10, 15, 20, 25, 30, 35, 40, 45, 50, 55, 60, 65, 70, 75, 80, 90, 100, 125, 150, 175, 200, 225, 250, 275 g/L, or about 300 g/L or more. The salt can include at least one of NaCl, NaBr, $CaCl_2$, $CaBr_2$, or $ZnBr_2$. The concentration of $Na^+$ ions in the aqueous liquid or the drilling fluid composition can be any suitable concentration of $Na^+$ ions, such as about 5 ppmw to about 200,000 ppmw, or about 100 ppmw to about 7,000 ppmw, or about 5 ppmw or less, or about 10 ppmw, 50, 100, 500, 1000, 5,000, 10,000, 15,000, 20,000, 50,000, 75,000, 100,000, 150,000, or about 200,000 ppmw or higher. The concentration of CF ions in the aqueous liquid or the drilling fluid composition can be any suitable concentration of $Cl^-$ ions, such as about 10 ppmw to about 400,000 ppmw, about 200 ppmw to about 14,000 ppmw, or about 10 ppmw or less, or about 20, 50, 100, 200, 500, 1,000, 2,500, 5,000, 7,500, 10,000, 12,500, or about 14,000 ppmw or more. The concentration of $K^+$ ions in the aqueous liquid or the drilling fluid composition can be any suitable concentration of $K^+$ ions, such as about 1 ppmw to about 70,000 ppmw, about 40 ppmw to about 2,500 ppmw, or about 1 ppmw or less, or about 10 ppmw, 20, 50, 100, 200, 500, 1,000, 2,500, 5,000, 10,000, 15,000, 20,000, 25,000, 50,000, or about 70,000 ppmw or more. The concentration of $Ca^{2+}$ ions in the aqueous liquid or the drilling fluid composition can be any suitable concentration of $Ca^{2+}$ ions, such as about 1 to about 70,000, or about 40 to about 2,500, or about 1 ppmw or less, or about 10 ppmw, 20, 50, 100, 200, 500, 1,000, 2,500, 5,000, 10,000, 15,000, 20,000, 25,000, 50,000, or about 70,000 ppmw or more. The concentration of $Br^-$ ions the aqueous liquid or the drilling fluid composition can be any suitable concentration of $Br^-$ ions, such as about 0.1 ppmw to about 12,000 ppmw, about 5 ppmw to about 450 ppmw. The aqueous solution can have any suitable density, such as about 0.9 $g/cm^3$ to about 3.0 $g/cm^3$, or about 1.1 $g/cm^3$ to about 2.5 $g/cm^3$, or about 0.9 $g/cm^3$ or less, or about 1 $g/cm^3$, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or about 3 $g/cm^3$.

Conditions downhole in the subterranean formation during the use of the drilling fluid composition in the subterranean formation can be any suitable conditions. For example, the conditions downhole in the subterranean formation can include a temperature of about 50° C. to about 600° C., or about 150° C. to about 500° C., or about 50° C. or less, or about 80° C., 100, 120, 140, 160, 180, 200, 220, 240, 260, 280, 300, 320, 340, 360, 380, 400, 450, 500, 550, or about 600° C. or more. The conditions downhole in the subterranean formation can include a pressure of about 1,000 psi to about 50,000 psi, or about 1,000 psi to about 25,000 psi, or about 1,000 psi or less, or about 2,000 psi, 4,000, 6,000, 8,000, 10,000, 12,000, 14,000, 16,000, 18,000, 20,000, 25,000, 30,000, 35,000, 40,000, 45,000, or about 50,000 psi or more. The conditions downhole in the subterranean formation can include a pH of about −20 to about 20, about −1 to about 14, or about −20 or less, or about −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, or about 20 or more.

The drilling fluid composition can have any suitable viscosity suitable for use as a drilling fluid under the downhole conditions under which the drilling fluid composition is used. For example, the drilling fluid composition can have a viscosity at standard temperature and pressure of about 0.01 cP to about 100,000 cP, about 10 cP to about 15,000 cP, or about 1000 cP to about 100,000 cP, or about 0.01 cP or less, or about 1 cP, 5, 10, 15, 20, 25, 50, 75, 100, 150, 200, 250, 300, 350, 400, 450, 500, 750, 1000, 1,250, 1,500, 1,750, 2,000, 2,250, 2,500, 5,000, 7,500, 10,000, 15,000, 20,000, 25,000, 50,000, 75,000 cP, or about 100,000 cP or more. In some embodiments, at a shear rate of about 0 $s^{-1}$ to about 1 $s^{-1}$ (e.g., over the entire range of shear rates or at one shear rate selected from the range) at standard temperature and pressure, the drilling fluid composition has a viscosity of 1000 cP to about 100,000 cP, or about 1000 cP or less, 1,250 cP, 1,500, 1,750, 2,000, 2,250, 2,500, 5,000, 7,500, 10,000, 15,000, 20,000, 25,000, 50,000, 75,000 cP, or about 100,000 cP or more. In some embodiments, at a shear rate of about 500 $s^{-1}$ to about 1000 $s^{-1}$, at standard temperature and pressure, the drilling fluid composition has a viscosity of 1000 cP to about 100,000 cP, or about 1000 cP or less, 1,250 cP, 1,500, 1,750, 2,000, 2,250, 2,500, 5,000, 7,500, 10,000, 15,000, 20,000, 25,000, 50,000, 75,000 cP, or about 100,000 cP or more. In some embodiments, at a temperature of about 100° C. to about 600° C., 100° C. to about 450° C., 100° C. to about 300° C., or about 100° C. to about 250° C. (e.g., over the entire range, or at a temperature selected from the range) and at about 14 psi to about 25,000 psi (e.g., over the entire range, or at a pressure selected from the range) the drilling fluid composition has a viscosity of 1000 cP to about 100,000 cP, or about 1000 cP or less, 1,250 cP, 1,500, 1,750, 2,000, 2,250, 2,500, 5,000, 7,500, 10,000, 15,000, 20,000, 25,000, 50,000, 75,000 cP, or about 100,000 cP or more. In some embodiments, at a shear rate of about 0 $s^{-1}$ to about 1 $s^{-1}$, at a temperature of about 100 to about 600° C., 100° C. to about 450° C., 100° C. to about 300° C., or about 100° C. to about 250° C., and at about 14 psi to about 25,000 psi, the drilling fluid composition has a viscosity of 1000 cP to about 100,000 cP, 1000 cP to about 100,000 cP, or about 1000 cP or less, 1,250 cP, 1,500, 1,750, 2,000, 2,250, 2,500, 5,000, 7,500, 10,000, 15,000, 20,000, 25,000, 50,000, 75,000 cP, or about 100,000 cP or more, such as a drilling fluid composition including at least one of a crosslinked poly(vinyl alcohol) and a crosslinked poly(vinyl alcohol) copolymer.

In various embodiments, the drilling fluid composition is substantially free of kaolinite (e.g., aluminosilicate clay mineral having the formula $Al_2Si_2O_5(OH)_4$, having triclinic pedial crystal symmetry), halloysite (e.g., aluminosilicate clay mineral having the formula $Al_2Si_2O_5(OH)_4$, having monoclinic domatic crystal symmetry), montmorillonite (e.g. soft phyllosilicate mineral having the formula $(Na,Ca)_{0.33}(Al,Mg)_2(Si_4O_{10})(OH)_2 \cdot nH_2O$, having monoclinic prismatic crustal symmetry), illite (e.g., micaceous mineral having the formula $(K,H_3O)(Al,Mg,Fe)_2(Si,Al)_4O_{10}[(OH)_2,(H_2O)]$), attapulgite (e.g., magnesium aluminum phyllosilicate having the formula $(Mg,Al)_2Si_4O_{10}(OH) \cdot _4(H_2O)$, having prismatic crystal symmetry), sepiolite (e.g., clay mineral having the formula $Mg_4Si_6O_{15}(OH)_2 \cdot 6H_2O$, having orthorhombic crystal symmetry), bentonite (e.g., an adsorbent aluminum phyllosilicate including predominantly montmorillonite), and mixtures thereof. In some embodiments, the drilling fluid composition is substantially free of kaolinite, halloysite, montmorillonite, illite, attapulgite, sepiolite, bentonite, hydrates thereof, and mixtures thereof, which are substantially insoluble in the drilling fluid composition and substantially having a particle size smaller than about No. 20 U.S. Standard Sieve Size and larger than about No. 325 mesh U.S. Standard Sieve Size (for example, smaller than 10 mesh, 20, 30, 40, 50, 60, 70, 80, 90, or 100 mesh, and such as larger than 200, 220, 240, 260, 280, 300, 320, 340, 360, 380, or 400 mesh).

In some embodiments, the drilling fluid composition can be substantially free of silicate compounds (e.g., materials including an anionic silicon compound such as $SiO_4^{4-}$). In some embodiments, the drilling fluid composition can be substantially free of aluminosilicate compounds (e.g. minerals including aluminum, silicon, and oxygen, and counterions). In some embodiments, the drilling fluid composition is substantially free of Al(O)OH and hydrates thereof, such as Al(O)OH $nH_2O$. The drilling fluid composition can be substantially free of $Al(OH)_3$ and hydrates thereof. The drilling fluid composition can be substantially free of hydroxyl-substituted aluminum compounds and salts thereof, such as sodium aluminate. In some embodiments, the drilling fluid composition can be substantially free of alumina.

Viscosifier

The drilling fluid composition includes a viscosifier including at least one of a poly(vinyl alcohol) copolymer, a crosslinked poly(vinyl alcohol), and a crosslinked poly(vinyl alcohol) copolymer. The viscosifier can be substantially homogenously distributed in the drilling fluid composition. The viscosifier can be a fluid loss control additive that can help control leakoff of the drilling fluid. The viscosifier can provide the drilling fluid composition with certain advantages over other drilling fluids. The viscosifier can be present in the drilling fluid composition in any suitable amount, such as about 0.000,1 wt % to about 90 wt %, about 0.01 wt % to about 40 wt %, about 0.1 wt % to about 10 wt %, or about 0.000,1 wt % or less, about 0.001 wt %, 0.005 wt %, 0.01, 0.05, 0.1, 0.2, 0.3, 0.4, 0.5, 0.6, 0.7, 0.8, 0.9, 1, 1.5, 2, 3, 4, 5, 6, 7, 8, 9, 10, 15, 20, 30, 40, 50, 60, 70, 80, 85, or about 90 wt % or more of the drilling fluid composition.

In some embodiments, the viscosifier in the drilling fluid composition can provide higher viscosities under conditions of at least one of lower shear rates, higher temperatures, and higher salt concentrations in the aqueous component, as compared to other viscosifiers. In some embodiments, the viscosifier can provide higher viscosities at low shear than other viscosifiers not including poly(vinyl alcohol) copolymers, or such as compared to viscosifiers including linear polymers (e.g. linear poly(vinyl alcohol) polymers) but not including crosslinked polymers such as crosslinked poly(vinyl alcohol), or crosslinked poly(vinyl alcohol) copolymers. In contrast to other viscosifiers, various embodiments of the viscosifier can provide suitably high viscosities in drilling fluids without the presence of hydroxyl-containing aluminum compounds, or without the presence of silicate or alumino-silicate compounds, such as silicate or alumino-silicate compounds insoluble in the drilling fluid and having a mesh size substantially between 20 and 325, such as under at least one of high salt concentration, high temperature, and low shear. In contrast to other viscosifiers, such as viscosifiers having ionic groups thereon, in various embodiments, the viscosifier can provide higher viscosity under high concentrations of salts such as $CaCl_2$ and $CaBr_2$, such as concentrations over 10 ppg. The viscosifier can provide suitable viscosities for drilling operations under a wide variety of conditions, including at any suitable temperature including low and medium temperatures, at any suitable shear rate including high shear, and at any suitable salinity level including fresh water or intermediate salinity.

In some embodiments, the poly(vinyl alcohol) copolymer, crosslinked poly(vinyl alcohol), or crosslinked poly(vinyl alcohol) copolymer is derived by hydrolysis of a corresponding poly(vinyl acetate) copolymer, crosslinked poly(vinyl acetate), or crosslinked poly(vinyl acetate) copolymer. In some embodiments, the method of treating the subterranean formation includes hydrolyzing at least one of a poly(vinyl acetate) copolymer, a crosslinked poly(vinyl acetate), and a crosslinked poly(vinyl acetate) copolymer to provide the poly(vinyl alcohol) copolymer, crosslinked poly(vinyl alcohol), or crosslinked poly(vinyl alcohol) copolymer. The hydrolyzing can occur in any suitable location and at any suitable time. For example, the hydrolyzing can occur above-surface. The hydrolyzing can occur downhole. The hydrolyzing occurs before the placement of the composition in the subterranean formation. The hydrolyzing can occur at least one of during and after the placement of the composition in the subterranean formation.

Any suitable proportion of the poly(vinyl alcohol) units in the viscosifier are hydrolyzed. In some embodiments, the poly(vinyl alcohol) polymer or copolymer is formed using a vinyl alcohol wherein the alcohol oxygen is in the form of an alkyl carboxylate having the vinyl group as an ester, such as a $(C_1-C_{10})$alkanoate, such as an acetate. For example, some or all of the vinyl alcohol units can be formed from vinyl acetate. The carboxylate groups can be hydrolyzed under appropriate conditions, such as acidic or basic conditions, to form any suitable proportion of alcoholic units in the polymer. In some embodiments, about 50 mol % to about 100 mol % of the poly(vinyl alcohol) units in the viscosifier are hydrolyzed, or about 80 mol % to about 100 mol %, or about 10 mol %, 15, 20, 25, 30, 35, 40, 45, 50, 55, 60, 65, 70, 75, 80, 85, 90, 95, or about 100 mol % of the poly(vinyl alcohol) units in the viscosifier are hydrolyzed. Hydrolyzed units of the poly(vinyl alcohol) polymer or copolymer can have the alcoholic oxygen in the form of an —OH, or can be further transformed after hydrolysis such as to be in the form of an oxygen atom bound to a grafted polymer or crosslinked to another or the same polymer. Non-hydrolyzed poly(vinyl alcohol) units in the viscosifier, such as the remaining non-hydrolyzed units, can have in place of the alcoholic hydrogen at each occurrence an independently selected $(C_1-C_{10})$alkyl-C(O)-substituent, such as about 0 mol % to about 90 mol % of the poly(vinyl alcohol) units in the viscosifier, or about 0 mol % to about 20 mol %, or about 0 mol %, 5, 10, 15, 20, 25, 30, 35, 40, 45, 50, 55, 60, 65, 70, 75, 80, 85 mol %, or about 90 mol % or more. In some examples, the non-hydrolyzed poly(vinyl alcohol) units are vinyl acetate units.

The crosslinked poly(vinyl alcohol) or the crosslinked poly(vinyl alcohol) copolymer can be crosslinked with any suitable crosslinker, such as by reacting a poly(vinyl alcohol) with the one or more crosslinkers to form the crosslinked poly(vinyl alcohol), or by reacting a poly(vinyl alcohol) copolymer with one or more crosslinkers to form the crosslinked poly(vinyl alcohol) copolymer. In some embodiments, the crosslinked poly(vinyl alcohol) or the crosslinked poly(vinyl alcohol) copolymer can be crosslinked with a crosslinker including at least one of chromium, aluminum, antimony, zirconium, titanium, calcium, boron, iron, silicon, copper, zinc, magnesium, and an ion thereof. The crosslinked poly(vinyl alcohol) or the crosslinked poly(vinyl alcohol) copolymer can be crosslinked with at least one of at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, and aluminum citrate.

In some embodiments, the crosslinked poly(vinyl alcohol) or the crosslinked poly(vinyl alcohol) copolymer is crosslinked with a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin. The crosslinked poly(vinyl alcohol) or the crosslinked poly(vinyl alcohol) copolymer can be crosslinked with at least one of epichlorohydrin, formaldehyde, and paraformaldehyde. Some embodiments of the method of treating the subterranean formation include crosslinking at least one of a poly(vinyl alcohol) and a poly(vinyl alcohol) copolymer to form at least one of the crosslinked poly(vinyl alcohol) and the crosslinked poly(vinyl alcohol) copolymer. The crosslinking can occur in any suitable location and at any suitable time. The crosslinking can occur at least one of above-surface and downhole. The crosslinking can occur before the placement of the composition in the subterranean formation. The crosslinking can occur at least one of during and after the placement of the composition in the subterranean formation. The crosslinking can be performed under any suitable conditions. In some embodiments, the crosslinking can be performed such that the hydroxyl-reactive moieties on the crosslinker are present during the crosslinking in excess or as the limiting reagent, such as in at least about 1 mol % with respect to the hydroxyl-moieties on the polymer, or about 1 mol % to about 400 mol %, or about 1 mol % to about 200 mol %, or about 1 mol % to about 40 mol %, or about 1 mol % or less, or about 10, 20, 30, 40, 50, 60, 70, 80, 90, 100, 120, 140, 160, 180, 200, 300, 400, or about 500 mol % or more. In some embodiments, crosslinking can be performed under acidic pH conditions, such crosslinking in the presence of aldehydes, esters, acids, epihalohydrins, and anhydrides, such as at about a pH or about 6, 5, 4, 3, 2, 1, or less.

The crosslinker can be an aldehyde. The crosslinker can be a substituted or unsubstituted ($C_1$-$C_{50}$)hydrocarbyl aldehyde having 1, 2, 3, 4, or 5 aldehyde moieties thereon. The crosslinker can be a polymer having one or more aldehyde moieties thereon. The crosslinker can be at least one of a poly(($C_1$-$C_{10}$)alkanylene) polymer or copolymer and a poly(($C_1$-$C_{10}$)alkanyleneoxide) or copolymer, wherein at each occurrence the ($C_1$-$C_{10}$)alkenylene is independently substituted or unsubstituted, wherein the polymer includes at least one aldehyde moiety thereon. The crosslinker can be at least one of H—C(O)—($C_0$-$C_{50}$)alkyl-C(O)—H and H—C(O)—($C_0$-$C_{50}$)alkyl. The crosslinker can be at least one of formaldehyde, ethanal, propanal, butanal, pentanal, hexanal, heptanal, octanal, nonanal, decanal, oxalaldehyde, malonaldehyde, succinaldehyde, glutaraldehyde, adipaldehyde, heptanedial, octanedial, nonanedial, decanedial, acetaldehyde, propionaldehyde, glycolaldehyde, glyoxalic acid, glyoxal, and paraformaldehyde. In some embodiments, the crosslinker can be an aldehyde formed from an aldehyde forming compound, for example, tri(methylol)melamine, hexa(methylol)melamine, tri(($C_1$-$C_3$)alkoxymethyl)melamine, or hexa(($C_1$-$C_3$)alkoxymethyl)melamine. In various embodiments, an aldehyde can be used as a crosslinker such that at least about 1 mol % of aldehydes occur with respect to hydroxyl moieties on the polymer, or about 1 mol % to about 400 mol %, or about 1 mol % to about 200 mol %, or about 1 mol % to about 40 mol %, or about 1 mol % or less, or about 10, 20, 30, 40, 50, 60, 70, 80, 90, 100, 120, 140, 160, 180, 200, 300, 400, or about 500 mol % or more.

In some embodiments, the crosslinker is an epihalohydrin. The crosslinker can be at least one of epibromohydrin and epichlorohydrin. The epibromohydrin or epichlorohydrin can be unsubstituted or substituted. The epihalohydrin can be substituted with at least one ($C_1$-$C_3$)alkyl group. The epihalohydrin is epichlorohydrin.

The crosslinker can be an acid anhydride. For example, the crosslinker can be at least one of phthalic anhydride, formic anhydride, acetic anhydride, maleic anhydride, acetic formic anhydride, a ($C_1$-$C_{20}$)alkanoic ($C_1$-$C_{20}$)alkanoic anhydride, propanoic acid anhydride, butanoic acid anhydride, pentanoic acid anhydride, hexanoic acid anhydride, octanoic acid anhydride, nonanoic acid anhydride, decanoic acid anhydride, salicylic acid anhydride, acrylic acid anhydride, aspartic acid anhydride, fumaric acid anhydride, methacrylic acid anhydride, hydroxypropyl acrylic acid anhydride, vinyl phosphonic acid anhydride, vinylidene diphosphonic acid anhydride, maleic anhydride, itaconic acid anhydride, crotonic acid anhydride, maleic acid anhydride, mesoconic acid anhydride, citraconic acid anhydride, styrene sulfonic acid anhydride, allyl sulfonic acid anhydride, methallyl sulfonic acid anhydride, and vinyl sulfonic acid anhydride.

In some embodiments, the crosslinker is at least one of poly(lactic acid), polyglycolide, polycaprolactone, polyhydroxyalkanoate, polyhydroxybutyrate, polyethylene adipate, polybutylene succinate, poly(3-hydroxybutyrate-co-3-hydroxyvalerate), poly(maleic anhydride), or a substituted or unsubstituted ($C_1$-$C_{20}$)hydrocarbyl ester of at least one of a poly(substituted or unsubstitued ($C_1$-$C_{20}$)alkenoic acid), a substituted or unsubstituted ($C_1$-$C_{20}$)alkenoic acid-substituted or unsubstituted ($C_1$-$C_{20}$)alkenoic acid copolymer, poly(acrylic acid), poly(methacrylic acid), polyglycolic acid, poly(aspartic acid), poly(fumaric acid), poly(hydroxypropyl acrylic acid), poly(vinyl phosphonic acid), poly(vinylidene diphosphonic acid), poly(itaconic acid), poly(crotonic acid), poly(maleic acid), poly(mesoconic acid), poly(citraconic acid), poly(styrene sulfonic acid), poly(allyl sulfonic acid), poly(methallyl sulfonic acid), vinyl sulfonic acid, acrylic acid-hydroxypropyl acrylate copolymer, hydrolyzed poly(maleic anhydride), maleic acid-acrylic acid copolymer, acrylic acid-2-acrylamino-2-methylpropanesulfonic acid copolymer, and a copolymer thereof.

The poly(vinyl alcohol) copolymer or crosslinked poly(vinyl alcohol) copolymer can be a copolymer formed from vinyl alcohol and any other suitable copolymerizing compound. In some embodiments, the other suitable copolymerizing compound is a water-soluble compound. In some embodiments, the other suitable copolymerizing compound is acrylamide, 2-acrylamido-2-methylpropane sulfonic acid (AMPS), or N-vinylpyrrolidone (NVP). The poly(vinyl alcohol) copolymer or the crosslinked poly(vinyl alcohol) copolymer can be at least one of a graft, linear, branched, block, and random copolymer that includes a poly(vinyl alcohol)-poly(acrylamide) copolymer, a poly(vinyl alcohol)-poly(2-acrylamido-2-methylpropanesulfonic acid) copolymer, a poly(vinyl alcohol)-poly(N-vinylpyrrolidone) copolymer, a poly(vinyl alcohol)-poly(methylenebisacrylamide) copolymer, a poly(vinyl alcohol)-poly(pentaerythritol allyl ether) copolymer, or a poly(vinyl alcohol)-poly(divinylbenzene) copolymer.

In some embodiments, the poly(vinyl alcohol) copolymer or crosslinked poly(vinyl alcohol) copolymer can be at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, a substituted or unsubstituted ($C_1$-$C_{20}$)alkyl ester thereof (e.g., of any member of the list), and N-vinylpyrrolidone. The poly(vinyl alcohol) copolymer or crosslinked poly(vinyl alcohol) copolymer can be at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkanoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1$-$C_{10})$alkenyl nitrogen containing substituted or unsubstituted $(C_1$-$C_{10})$heterocycle.

In some embodiments, the poly(vinyl alcohol) copolymer, the crosslinked poly(vinyl alcohol), or the crosslinked poly(vinyl alcohol) copolymer includes repeating units having a chemical structure of Structure I:

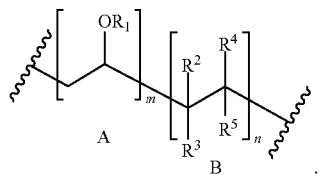

Structure I

Repeating units A and B can be in a block or random copolymer arrangement. At each occurrence $R^1$ can be independently selected from the group consisting of —H, CL, and $R^6$. At each occurrence $R^6$ can be independently selected from the group consisting of $(C_1$-$C_{10})$hydrocarbyl and poly($(C_1$-$C_{10})$hydrocarbylene) wherein at each occurrence the hydrocarbyl and the hydrocarbylene are each independently substituted or unsubstituted and are each independently interrupted or terminated by 0, 1, 2, or 3 of at least one of —O—, —NH—, —$NR^6$—, and —S—. At each occurrence $R^2$, $R^3$, $R^4$, and $R^5$ can be each independently selected from the group consisting of —H, OH, and —$R^6$, wherein at each occurrence $R^2$, $R^3$, $R^4$, and $R^5$ are independently optionally substituted with at least one —O—CL group. At each occurrence $R^2$, $R^3$, $R^4$, and $R^5$ can be independently optionally bonded to a carbon atom of at least one repeating unit of the same or another poly(vinyl alcohol) copolymer or crosslinked poly(vinyl alcohol). At each occurrence, CL can be a crosslinking group that crosslinks to at least one oxygen atom of at least one vinyl alcohol-unit of the same or another poly(vinyl alcohol) copolymer, crosslinked poly(vinyl alcohol), and crosslinked poly(vinyl alcohol) copolymer including repeating units having a chemical structure of Structure I. The variable m can be 1 to 200,000. The variable n can be 0 to 200,000.

The poly(vinyl alcohol) copolymer can include repeating units having a chemical structure of Structure I wherein at each occurrence $R^1$ can be selected from the group consisting of —H and —C(O)—$CH_3$. The crosslinked poly(vinyl alcohol) can include repeating units having a chemical structure of Structure I wherein n can be 0, and wherein at least one $R^1$ in the structure can be CL.

The crosslinked poly(vinyl alcohol) can include repeating units having the chemical structure:

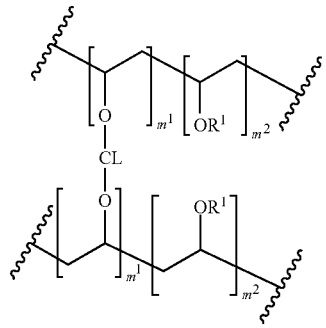

The variable $m^1$+$m^2$ can be equal to m.

The crosslinked poly(vinyl alcohol) copolymer can include repeating units having a chemical structure of Structure I wherein n can be at least 1, and wherein at least one $R^1$ in the structure can be CL. The crosslinked poly(vinyl alcohol) copolymer can include repeating units having a chemical structure of

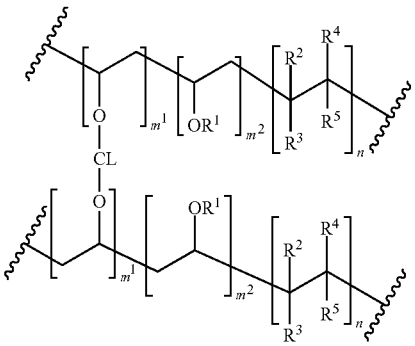

At each occurrence $R^2$, $R^3$, $R^4$, and $R^5$ can be independently optionally bonded to a carbon atom of at least one repeating unit of the same or another poly(vinyl alcohol) copolymer or crosslinked poly(vinyl alcohol). In some embodiments, the crosslinked poly(vinyl alcohol) copolymer is crosslinked via at least one of di- and poly-alkenyl containing monomers used to synthesize the poly(vinyl alcohol) copolymer. The poly(vinyl alcohol) copolymer or crosslinked poly(vinyl alcohol) copolymer can be at least one of a graft, linear, branched, block, and random copolymer of vinyl alcohol and a substituted or unsubstituted $(C_1$-$C_{20})$hydrocarbylene interrupted or terminated with 0, 1, 2, or 3 O, NH, or S, the $(C_1$-$C_{20})$hydrocarbylene being substituted with two substituted or unsubstituted $(C_2$-$C_5)$ alkenyl groups. For example, the crosslinked poly(vinyl alcohol) copolymer is crosslinked via at least one monomer selected from the group consisting of methylenebisacrylamide, pentaerythritol allyl ether, and divinylbenzene. For example, vinyl acetate, in the presence of crosslinkers such as methylenebisacrylamide, pentaerythritol allyl ether, and divinyl benzene, optionally with additional comonomers, followed by hydrolysis of the acetate to give a crosslinked PVA copolymer, which can optionally be further crosslinked via the pendant —OH groups on the copolymer.

The crosslinked poly(vinyl alcohol) can include repeating units having the chemical structure:

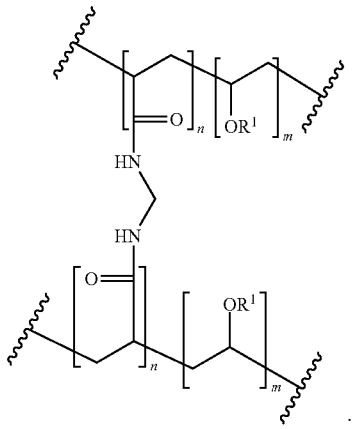

The crosslinked poly(vinyl alcohol) can include repeating units having the chemical structure:

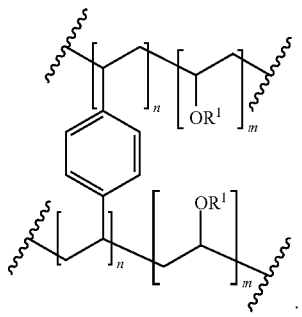

In some embodiments, at each occurrence $R^2$, $R^3$, $R^4$, and $R^5$ can be each independently selected from —H, —OH, and substituted or unsubstituted $(C_1\text{-}C_{10})$hydrocarbyl. At each occurrence $R^2$, $R^3$, $R^4$, and $R^5$ can be each independently selected from —H, —OH, and substituted or unsubstituted $(C_1\text{-}C_5)$alkyl. The variables $R^2$ and $R^5$ can be —H.

In some embodiments, $R^2$ and $R^5$ can be —H, $R^3$ can be —H, and $R^4$ can be —C(O)—$NH_2$. The poly(vinyl alcohol) copolymer or crosslinked poly(vinyl alcohol) copolymer can include repeating units having the chemical structure:

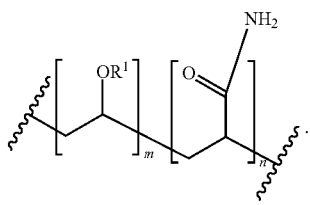

In some embodiments, $R^2$, $R^3$, and $R^5$ can be —H, and $R^4$ can be —C(O)—NH—C($CH_3$)$_2$—$CH_2$—S(O)(O)OH. The poly(vinyl alcohol) copolymer or crosslinked poly(vinyl alcohol) copolymer can include repeating units having the chemical structure:

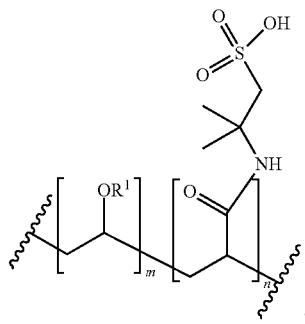

In some embodiments, $R^2$, $R^3$, and $R^5$ can be —H, and $R^4$ can be 2-pyrrolidone bound via the N. The poly(vinyl alcohol) copolymer or crosslinked poly(vinyl alcohol) copolymer can include repeating units having a chemical structure

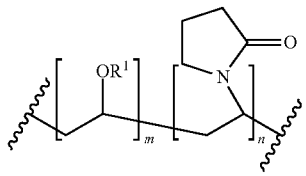

The poly(vinyl alcohol) copolymer can have any suitable molecular weight, such as a molecular weight of about 5,000 mol/g to about 500,000 mol/g, 5,000 mol/g to about 200,000 mol/g, or about 5,000 mol/g or less, or about 10,000, 20,000, 25,000, 50,000, 100,000, 150,000, 200,000, 300,000, 400,000, or about 500,000 or more. The crosslinked poly(vinyl alcohol) or the crosslinked poly(vinyl alcohol) copolymer can have any suitable molecular weight, such as a molecular weight of about 5,000 mol/g to about 50,000,000 mol/g, about 10,000 mol/g to about 10,000,000 mol/g, about 20,000 mol/g to about 5,000,000 mol/g, or about 5,000 mol/g or less, or about 10,000, 20,000, 25,000, 50,000, 100,000, 150,000, 200,000, 300,000, 400,000, 500,000, 750,000, 1,000,000, 1,500,000, 2,000,000, 5,000,000, 10,000,000, 25,000,000, or about 50,000,000 mol/g or more.

The group CL can be derived by crosslinking the poly (vinyl alcohol) or poly(vinyl alcohol) copolymer using any suitable crosslinker, such as any crosslinker described herein. Any suitable proportion of the hydrolyzed alcohol moeities on the backbone of the poly(vinyl alcohol) polymer or poly(vinyl alcohol) copolymer can be substituted by CL. In some embodiments, about 0.1 mol % to about 99 mol % of vinyl alcohol units can have $R^1$=CL, 3 mol % to about 70 mol %, or about 0.1 mol % or less, or about 0.5, 1, 2, 3, 4, 5, 10, 15, 20, 25, 30, 35, 40, 45, 50, 55, 60, 65, 70, 75, 80, 85, 90, 95, 96, 97, 98, and about 99 mol % of vinyl alcohol units can have $R^1$=CL.

In some embodiments, at each occurrence, CL can be independently selected from the group consisting of —($C_1$-$C_{50}$)hydrocarbylene-, -poly(($C_1$-$C_{10}$)hydrocarbylene)-, —Mg—

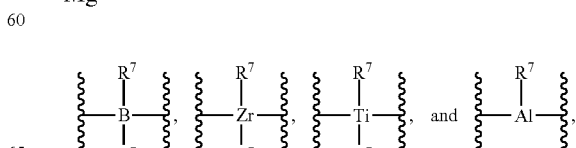

wherein at each occurrence the hydrocarbylene can be independently substituted or unsubstituted and can be interrupted or terminated by 0, 1, 2, or 3 of at least one of —O—, —NH—, —NR$^6$—, and —S—, and wherein at each occurrence R$^7$ can be independently selected from the group consisting of R$^6$, —OH, and —O—CL. In some examples, CL can be selected from the group consisting of $(C_1-C_{50})$ hydrocarbylene and —C(O)—$(C_1-C_{50})$hydrocarbylene-C (O)—, wherein $(C_1-C_{50})$hydrocarbylene can be substituted or unsubstituted and can be optionally interrupted or terminated by 1, 2, or 3 O atoms. The variable CL can be selected from the group consisting of $(C_1-C_{20})$alkylene and —C(O)—$(C_1-C_{20})$alkylene-C(O)—, wherein $(C_1-C_{20})$alkylene can be optionally interrupted or terminated by 1, 2, or 3 O atoms. The variable CL can be derived from crosslinking the poly(vinyl alcohol) or poly(vinyl alcohol) copolymer with a crosslinker that can be at least one of epichlorohydrin, formaldehyde, paraformaldehyde. The variable CL can be derived from crosslinking the poly(vinyl alcohol) or poly (vinyl alcohol) copolymer using a crosslinker including at least one of chromium, aluminum, antimony, zirconium, titanium, calcium, boron, iron, silicon, copper, zinc, magnesium, and an ion thereof. The variable CL can be derived from crosslinking the poly(vinyl alcohol) or poly(vinyl alcohol) copolymer with a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

Optional Components

The drilling fluid composition can include any suitable optional component, such that the drilling fluid composition can be used as described herein.

In some embodiments, the drilling fluid composition can include a viscosifier in addition to the viscosifier that includes at least one of a poly(vinyl alcohol) copolymer, a crosslinked poly(vinyl alcohol), and a crosslinked poly (vinyl alcohol) copolymer. The additional viscosifier can be any suitable viscosifier. The additional viscosifier can cause viscosification at least one of upon addition, over time, after a delay, and in response to a stimulus such as addition of a crosslinker or activation of a crosslinker. In some examples, the additional viscosifier can be a crosslinked gel or a crosslinkable gel, such as any suitable crosslinked gel or crosslinkable gel. For example, the crosslinked gel or crosslinkable gel can be at least one of a linear polysaccharide and a poly(($C_2-C_{10}$)alkenylene), wherein the ($C_2-C_{10}$)alkenylene is substituted or unsubstituted. The gel or crosslinked gel can include least one of poly(acrylic acid) or ($C_1-C_5$)alkyl esters thereof, poly(methacrylic acid) or ($C_1-C_5$)alkyl esters thereof, poly(vinyl acetate), poly(vinyl alcohol), poly(ethylene glycol), poly(vinyl pyrrolidone), polyacrylamide, poly(hydroxyethyl methacrylate), acetan, alginate, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar, gum ghatti, gum arabic, locust bean gum, cellulose, and derivatized cellulose. The gel or crosslinked gel can include cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar. The additional viscosifier can form any suitable proportion of the drilling fluid composition, such as about 0.001 wt % to about 10 wt %, 0.01 wt % to about 0.6 wt %, about 0.13 wt % to about 0.30 wt %, or about 0.001 wt % or less, or about 0.005 wt %, 0.01, 0.05, 0.1, 0.2, 0.3, 0.4, 0.5, 0.6, 0.7, 0.8, 0.9, 1, 1.5, 2, 3, 4, 5, 6, 7, 8, 9, or about 10 wt % of the drilling fluid composition.

The drilling fluid composition can include a crosslinker. The crosslinker can be any suitable crosslinker, such as a crosslinker suitable for crosslinking a crosslinkable or at least partially crosslinked gel in the drilling fluid composition. For example, the crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, or aluminum citrate. The crosslinker can be present in any suitable proportion of the drilling fluid composition, such as about 0.000,001 wt % to about 5 wt %, about 0.001 wt % to about 2 wt %, or about 0.000,001 wt % or less, or about 0.000,01 wt %, 0.000,1, 0.001, 0.01, 0.1, 1, 1.5, 2, 2.5, 3, 3.5, 4, 4.5, or about 5 wt % of the drilling fluid composition or more. The method can include crosslinking the gel or the crosslinked gel. In some embodiments, the crosslinking occurs above-surface. In some embodiments, the crosslinking occurs downhole, such as during or after placement of the drilling fluid composition in the subterranean formation.

In various embodiments, the drilling fluid composition includes at least one of: thinner additives such as COLDTROL®, ATC®, OMC 2™, and OMC 42™; RHEMOD™, a viscosifier and suspension agent including a modified fatty acid; additives for providing temporary increased viscosity, such as for shipping (e.g., transport to the well site) and for use in sweeps (for example, additives having the tradename TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a HTHP filtration control agent including a crosslinked copolymer; DURATONE® HT, a filtration control agent that includes an organophilic lignite, more particularly organophilic leonardite; THERMO TONE™, a high temperature high pressure (HTHP) filtration control agent including a synthetic polymer; BDF™-366, a HTHP filtration control agent; BDF™-454, a HTHP filtration control agent; LIQUITONE™, a polymeric filtration agent and viscosifier; additives for HTHP emulsion stability, for example, FACTANT™, which includes highly concentrated tall oil derivative; emulsifiers such as LE SUPERMUL™ and EZ MUL® NT, polyaminated fatty acid emulsifiers, and FORTI-MUL®; DRIL TREAT®, an oil wetting agent for heavy fluids; BARACARB®, a bridging agent which includes a sized calcium carbonate (ground marble); BAROID®, a weighting agent that includes barium sulfate; BAROLIFT®, a hole sweeping agent; SWEEP-WATE®, a sweep weighting agent; BDF-508, a diamine dimer rheology modifier; GELTONE® II organophilic clay; BAROFIBRE™ O for lost circulation management and seepage loss prevention, including a natural cellulose fiber; STEEL-SEAL®, a lost circulation material including a polymer; HYDRO-PLUG®, a lost circulation material including a Portland cement formulation; lime, which can provide alkalinity and can activate certain emulsifiers; and calcium chloride, which can provide salinity.

In some embodiments, the drilling fluid composition can include any suitable amount of any suitable material used in a downhole fluid. For example, the drilling fluid composition can include water, saline, aqueous base, oil, organic solvent, synthetic fluid oil phase, aqueous solution, alcohol or polyol, cellulose, starch, alkalinity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, dispersants, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement fly ash, metakaolin, shale, zeolite, a crystalline silica compound, amorphous silica, hydratable clays, microspheres, pozzolan lime, or a combination thereof.

The drilling fluid composition can include a payload material. The payload can be deposited in any suitable downhole location. The method can include using the drilling fluid composition to deposit a payload material into a subterranean fracture. The subterranean fracture can be any suitable subterranean fracture. In some embodiments, the method includes forming the subterranean fracture; in other embodiments, the subterranean fracture is already formed. The payload material can be a proppant, or any other suitable payload material, such as a resin-coated proppant, a curable material, an encapsulated resin, a resin, a Portland cement, a pozzolana cement, a gypsum cement, a high alumina content cement, a slag cement, a silica cement, a cementitous kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Drilling Assembly.

The exemplary drilling fluid composition including the viscosifier including at least one of a poly(vinyl alcohol) copolymer, a crosslinked poly(vinyl alcohol), and a crosslinked poly(vinyl alcohol) copolymer disclosed herein may directly or indirectly affect one or more components or pieces of equipment associated with the preparation, delivery, recapture, recycling, reuse, and/or disposal of the disclosed drilling fluid composition. For example, and with reference to FIG. 1, the disclosed drilling fluid composition including the viscosifier including at least one of a poly (vinyl alcohol) copolymer, a crosslinked poly(vinyl alcohol), and a crosslinked poly(vinyl alcohol) copolymer may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

The viscosifier including at least one of a poly(vinyl alcohol) copolymer, a crosslinked poly(vinyl alcohol), and a crosslinked poly(vinyl alcohol) copolymer may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the viscosifier including at least one of a poly(vinyl alcohol) copolymer, a crosslinked poly(vinyl alcohol), and a crosslinked poly(vinyl alcohol) copolymer may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the viscosifier including at least one of a poly(vinyl alcohol) copolymer, a crosslinked poly (vinyl alcohol), and a crosslinked poly(vinyl alcohol) copolymer may be stored, reconditioned, and/or regulated until added to the drilling fluid 122.

As mentioned above, the drilling fluid composition including the viscosifier including at least one of a poly(vinyl alcohol) copolymer, a crosslinked poly(vinyl alcohol), and a crosslinked poly(vinyl alcohol) copolymer may directly or indirectly affect the components and equipment of the drilling assembly 100. For example, the drilling fluid composition including the viscosifier may directly or indirectly affect the fluid processing unit(s) 128, which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the drilling fluid composition including the viscosifier.

The drilling fluid composition including the viscosifier including at least one of a poly(vinyl alcohol) copolymer, a crosslinked poly(vinyl alcohol), and a crosslinked poly(vinyl alcohol) copolymer may directly or indirectly affect the pump 120, which representatively includes any conduits, pipelines, trucks, tubulars, and/or pipes used to fluidically convey the drilling fluid composition including the viscosifier downhole, any pumps, compressors, or motors (e.g., topside or downhole) used to drive the drilling fluid composition into motion, any valves or related joints used to regulate the pressure or flow rate of the drilling fluid composition, and any sensors (e.g., pressure, temperature, flow rate, etc.), gauges, and/or combinations thereof, and the like. The drilling fluid composition including the viscosifier may also directly or indirectly affect the mixing hopper 134 and the retention pit 132 and their assorted variations.

The drilling fluid composition including the viscosifier including at least one of a poly(vinyl alcohol) copolymer, a crosslinked poly(vinyl alcohol), and a crosslinked poly(vinyl alcohol) copolymer may also directly or indirectly affect the various downhole equipment and tools that may come into contact with the drilling fluid composition including the viscosifier such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The drilling fluid composition including the viscosifier described herein may also directly or indirectly affect any downhole heat exchangers, valves and corresponding actuation devices, tool seals, packers and other wellbore isolation devices or components, and the like associated with the wellbore 116. The drilling fluid composition including the viscosifier may also directly or indirectly affect the drill bit 114, which may include, but is not limited to, roller cone bits, PDC bits, natural diamond bits, any hole openers, reamers, coring bits, and the like.

While not specifically illustrated herein, the drilling fluid composition including the viscosifier including at least one of a poly(vinyl alcohol) copolymer, a crosslinked poly(vinyl alcohol), and a crosslinked poly(vinyl alcohol) copolymer may also directly or indirectly affect any transport or delivery equipment used to convey the drilling fluid composition including the viscosifier to the drilling assembly 100 such as, for example, any transport vessels, conduits, pipelines, trucks, tubulars, and/or pipes used to fluidically move the drilling fluid composition from one location to another, any pumps, compressors, or motors used to drive the drilling fluid composition into motion, any valves or related joints used to regulate the pressure or flow rate of the drilling fluid composition, and any sensors (e.g., pressure and temperature), gauges, and/or combinations thereof, and the like.

System.

In various embodiments, the present invention provides a system. The system can include a composition including a drilling fluid composition including a viscosifier including at least one of a poly(vinyl alcohol) copolymer, a crosslinked poly(vinyl alcohol), and a crosslinked poly(vinyl alcohol) copolymer, such as any drilling fluid composition described herein. The system can also include a subterranean formation including the drilling fluid composition therein.

Drilling Fluid Composition for Treatment of a Subterranean Formation.

Various embodiments provide a drilling fluid composition for treatment of a subterranean formation. The drilling fluid composition can be any suitable composition that can be used to perform an embodiment of the method for treatment of a subterranean formation described herein. For example, the composition can include a viscosifier including at least one of a poly(vinyl alcohol) copolymer, a crosslinked poly(vinyl alcohol), and a crosslinked poly(vinyl alcohol) copolymer, such as any viscosifier described herein Method for Preparing a Drilling Fluid Composition for Treatment of a Subterranean Formation.

In various embodiments, the present invention provides a method for preparing a drilling fluid composition for treatment of a subterranean formation. The method can be any suitable method that produces a drilling fluid composition described herein. For example, the method can include forming a drilling fluid composition including a viscosifier including at least one of a poly(vinyl alcohol) copolymer, a crosslinked poly(vinyl alcohol), and a crosslinked poly(vinyl alcohol) copolymer.

The terms and expressions which have been employed are used as terms of description and not of limitation, and there is no intention in the use of such terms and expressions of excluding any equivalents of the features shown and described or portions thereof, but it is recognized that various modifications are possible within the scope of embodiments of the invention claimed. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a method of treating a subterranean formation, the method comprising: obtaining or providing a drilling fluid composition comprising a viscosifier comprising at least one of a poly(vinyl alcohol) copolymer, a crosslinked poly(vinyl alcohol), and a crosslinked poly(vinyl alcohol) copolymer; placing the drilling fluid composition in a subterranean formation downhole.

Embodiment 2 provides the method of Embodiment 1, further comprising performing a subterranean drilling operation in the subterranean formation after placing the drilling fluid composition in the subterranean formation.

Embodiment 3 provides the method of any one of Embodiments 1-2, wherein the viscosifier is substantially homogenously distributed in the drilling fluid composition.

Embodiment 4 provides the method of any one of Embodiments 1-3, wherein the viscosifier is a fluid loss control additive.

Embodiment 5 provides the method of any one of Embodiments 1-4, wherein the drilling fluid composition further comprises at least one of brine, sea water, brackish water, flow back water, production water, oil, and an organic solvent.

Embodiment 6 provides the method of any one of Embodiments 1-5, wherein the obtaining or providing of the drilling fluid composition occurs above-surface.

Embodiment 7 provides the method of any one of Embodiments 1-6, wherein the obtaining or providing of the drilling fluid composition occurs downhole.

Embodiment 8 provides the method of any one of Embodiments 1-7, wherein the drilling fluid composition comprises an aqueous liquid comprising at least one salt, at least one ion, or a combination thereof, dissolved therein.

Embodiment 9 provides the method of Embodiment 8, wherein about 20 wt % to about 99.999,999 wt % of the drilling fluid composition comprises the aqueous liquid.

Embodiment 10 provides the method of any one of Embodiments 8-9, wherein about 50 wt % to about 99 wt % of the drilling fluid composition comprises the aqueous liquid.

Embodiment 11 provides the method of any one of Embodiments 8-10, wherein the aqueous liquid comprise a salt concentration of about 0.000,000,1 g/L to about 250 g/L.

Embodiment 12 provides the method of any one of Embodiments 8-11, wherein the aqueous liquid comprise a salt concentration of about 10 g/L to about 250 g/L.

Embodiment 13 provides the method of any one of Embodiments 8-12, wherein the salt comprises at least one of NaCl, NaBr, $CaCl_2$, $CaBr_2$, and $ZnBr_2$.

Embodiment 14 provides the method of any one of Embodiments 8-13, wherein the aqueous liquid comprises a concentration of $Na^+$ ions of about 5 ppmw to about 200,000 ppmw.

Embodiment 15 provides the method of any one of Embodiments 8-14, wherein the aqueous liquid comprises a concentration of $Na^+$ ions of about 100 ppmw to about 7,000 ppmw.

Embodiment 16 provides the method of any one of Embodiments 8-15, wherein the aqueous liquid comprises a concentration of $Cl^-$ ions of about 10 ppmw to about 400,000 ppmw.

Embodiment 17 provides the method of any one of Embodiments 8-16, wherein the aqueous liquid comprises a concentration of $Cl^-$ ions of about 200 ppmw to about 14,000 ppmw.

Embodiment 18 provides the method of any one of Embodiments 8-17, wherein the aqueous liquid comprises a concentration of $K^+$ ions of about 1 ppmw to about 70,000 ppmw.

Embodiment 19 provides the method of any one of Embodiments 8-18, wherein the aqueous liquid comprises a concentration of $K^+$ ions of about 40 ppmw to about 2,500 ppmw.

Embodiment 20 provides the method of any one of Embodiments 8-19, wherein the aqueous liquid comprises a concentration of $Ca^{2+}$ ions of about 1 ppmw to about 70,000 ppmw.

Embodiment 21 provides the method of any one of Embodiments 8-20, wherein the aqueous liquid comprises a concentration of $Ca^{2+}$ ions of about 40 ppmw to about 2,500 ppmw.

Embodiment 22 provides the method of any one of Embodiments 8-21, wherein the aqueous liquid comprises a concentration of $Br^-$ ions of about 0.1 ppmw to about 12,000 ppmw.

Embodiment 23 provides the method of any one of Embodiments 8-22, wherein the aqueous liquid comprises a concentration of $Br^-$ ions of about 5 ppmw to about 450 ppmw.

Embodiment 24 provides the method of any one of Embodiments 1-23, wherein the drilling fluid composition comprises an aqueous salt solution having a density of about 0.9 $g/cm^3$ to about 3.0 $g/cm^3$.

Embodiment 25 provides the method of any one of Embodiments 1-24, wherein the drilling fluid composition comprises an aqueous salt solution having a density of about 1.1 $g/cm^3$ to about 2.5 $g/cm^3$.

Embodiment 26 provides the method of any one of Embodiments 1-25, wherein conditions downhole in the subterranean formation comprise a temperature of about 50° C. to about 600° C.

Embodiment 27 provides the method of any one of Embodiments 1-26, wherein conditions downhole in the subterranean formation comprise a temperature of about 150° C. to about 500° C.

Embodiment 28 provides the method of any one of Embodiments 1-27, wherein conditions downhole in the subterranean formation comprise a pressure of about 1,000 psi to about 50,000 psi.

Embodiment 29 provides the method of any one of Embodiments 1-28, wherein conditions downhole in the subterranean formation comprise a pressure of about 1,000 psi to about 25,000 psi.

Embodiment 30 provides the method of any one of Embodiments 1-29, wherein conditions downhole in the subterranean formation comprise a pH of about −20 to about 20.

Embodiment 31 provides the method of any one of Embodiments 1-30, wherein conditions downhole in the subterranean formation comprise a pH of about −1 to about 14.

Embodiment 32 provides the method of any one of Embodiments 1-31, wherein the drilling fluid composition comprises a viscosity at standard temperature and pressure of about 0.01 cP to about 100,000 cP.

Embodiment 33 provides the method of any one of Embodiments 1-32, wherein the drilling fluid composition comprises a viscosity at standard temperature and pressure of 10 cP to about 15,000 cP.

Embodiment 34 provides the method of any one of Embodiments 1-33, wherein the drilling fluid composition comprises a viscosity at standard temperature and pressure of 1000 cP to about 100,000 cP.

Embodiment 35 provides the method of any one of Embodiments 1-34, wherein at a shear rate of about 0 $s^{-1}$ to about 1 $s^{-1}$, at standard temperature and pressure, the drilling fluid composition comprises a viscosity of 1000 cP to about 100,000 cP.

Embodiment 36 provides the method of any one of Embodiments 1-35, wherein at a shear rate of about 500 $s^{-1}$ to about 1000 $s^{-1}$, at standard temperature and pressure, the drilling fluid composition comprises a viscosity of 1000 cP to about 100,000 cP.

Embodiment 37 provides the method of any one of Embodiments 1-36, wherein at a temperature of about 100° C. to about 600° C. and at about 14 psi to about 25,000 psi the drilling fluid composition comprises a viscosity of 1000 cP to about 100,000 cP.

Embodiment 38 provides the method of any one of Embodiments 1-37, wherein at a shear rate of about 0 s$^{-1}$ to about 1 s$^{-1}$, at a temperature of about 100 to about 600° C. and at about 14 psi to about 25,000 psi the drilling fluid composition comprises a viscosity of 1000 cP to about 100,000 cP.

Embodiment 39 provides the method of any one of Embodiments 1-38, wherein the viscosifier comprises a crosslinked poly(vinyl alcohol), and a crosslinked poly(vinyl alcohol) copolymer, wherein at a shear rate of about 0 s$^{-1}$ to about 1 s$^{-1}$, at a temperature of about 100° C. to about 600° C. and at about 14 psi to about 25,000 psi the drilling fluid composition comprises a viscosity of 1000 cP to about 100,000 cP.

Embodiment 40 provides the method of any one of Embodiments 1-39, wherein the drilling fluid composition is substantially free of kaolinite, halloysite, montmorillonite, illite, attapulgite, sepiolite, bentonite, hydrates thereof, and mixtures thereof.

Embodiment 41 provides the method of any one of Embodiments 1-40, wherein the drilling fluid composition is substantially free of kaolinite, halloysite, montmorillonite, illite, attapulgite, sepiolite, bentonite, hydrates thereof, and mixtures thereof, substantially insoluble in the drilling fluid composition and substantially having a particle size smaller than No. 20 U.S. Standard Sieve Size and larger than No. 325 mesh U.S. Standard Sieve Size.

Embodiment 42 provides the method of any one of Embodiments 1-41, wherein the drilling fluid composition is substantially free of silicate compounds.

Embodiment 43 provides the method of any one of Embodiments 1-42, wherein the drilling fluid composition is substantially free of aluminosilicate compounds.

Embodiment 44 provides the method of any one of Embodiments 1-43, wherein the drilling fluid composition is substantially free of Al(O)OH and hydrates thereof.

Embodiment 45 provides the method of any one of Embodiments 1-44, wherein the drilling fluid composition is substantially free of Al(OH)$_3$ and hydrates thereof.

Embodiment 46 provides the method of any one of Embodiments 1-45, wherein the drilling fluid composition is substantially free of hydroxyl-substituted aluminum compounds and salts thereof.

Embodiment 47 provides the method of any one of Embodiments 1-46, wherein the drilling fluid composition is substantially free of alumina.

Embodiment 48 provides the method of any one of Embodiments 1-47, wherein about 0.000,1 wt % to about 90 wt % of the drilling fluid composition comprises the viscosifier.

Embodiment 49 provides the method of any one of Embodiments 1-48, wherein about 1 wt % to about 40 wt % of the drilling fluid composition comprises the viscosifier.

Embodiment 50 provides the method of any one of Embodiments 1-49, wherein about 50 mol % to about 100 mol % of the poly(vinyl alcohol) units in the viscosifier are hydrolyzed.

Embodiment 51 provides the method of any one of Embodiments 1-50, wherein about 80 mol % to about 100 mol % of the poly(vinyl alcohol) units in the viscosifier are hydrolyzed.

Embodiment 52 provides the method of any one of Embodiments 1-51, wherein about 50-100 mol % of the poly(vinyl alcohol) units in the viscosifier are hydrolyzed, the non-hydrolyzed poly(vinyl alcohol) units having in place of the alcohol hydrogen at each occurrence an independently selected (C$_1$-C$_{10}$)alkyl-C(O)— substituent.

Embodiment 53 provides the method of any one of Embodiments 1-52, wherein about 50-100 mol % of the poly(vinyl alcohol) units in the viscosifier are hydrolyzed, the non-hydrolyzed poly(vinyl alcohol) units being vinyl acetate units.

Embodiment 54 provides the method of any one of Embodiments 1-53, wherein the poly(vinyl alcohol) copolymer, crosslinked poly(vinyl alcohol), or crosslinked poly(vinyl alcohol) copolymer is derived by hydrolysis of a corresponding poly(vinyl acetate) copolymer, crosslinked poly(vinyl acetate), or crosslinked poly(vinyl acetate) copolymer.

Embodiment 55 provides the method of any one of Embodiments 1-54, further comprising hydrolyzing at least one of a poly(vinyl acetate) copolymer, a crosslinked poly(vinyl acetate), and a crosslinked poly(vinyl acetate) copolymer to provide the poly(vinyl alcohol) copolymer, crosslinked poly(vinyl alcohol), or crosslinked poly(vinyl alcohol) copolymer.

Embodiment 56 provides the method of Embodiment 55, wherein the hydrolyzing occurs above-surface.

Embodiment 57 provides the method of any one of Embodiments 55-56, wherein the hydrolyzing occurs downhole.

Embodiment 58 provides the method of any one of Embodiments 55-57, wherein the hydrolyzing occurs before the placement of the drilling fluid composition in the subterranean formation.

Embodiment 59 provides the method of any one of Embodiments 55-58, wherein the hydrolyzing occurs at least one of during and after the placement of the drilling fluid composition in the subterranean formation.

Embodiment 60 provides the method of any one of Embodiments 1-59, wherein at least one of the crosslinked poly(vinyl alcohol) and the crosslinked poly(vinyl alcohol) copolymer is crosslinked with a crosslinker comprising at least one of chromium, aluminum, antimony, zirconium, titanium, calcium, boron, iron, silicon, copper, zinc, magnesium, and an ion thereof.

Embodiment 61 provides the method of Embodiment 60, wherein at least one of the crosslinked poly(vinyl alcohol) and the crosslinked poly(vinyl alcohol) copolymer is crosslinked with at least one of at least one of boric acid, borax, a borate, a (C$_1$-C$_{30}$)hydrocarbylboronic acid, a (C$_1$-C$_{30}$) hydrocarbyl ester of a (C$_1$-C$_{30}$)hydrocarbylboronic acid, a (C$_1$-C$_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, and aluminum citrate.

Embodiment 62 provides the method of any one of Embodiments 1-61, wherein at least one of the crosslinked poly(vinyl alcohol) and the crosslinked poly(vinyl alcohol) copolymer is crosslinked with a crosslinker comprising at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

Embodiment 63 provides the method of Embodiment 62, wherein the crosslinker is a substituted or unsubstituted $(C_1-C_{50})$hydrocarbyl aldehyde having 1, 2, 3, 4, or 5 aldehyde moieties thereon.

Embodiment 64 provides the method of any one of Embodiments 62-63, wherein the crosslinker is a polymer having one or more aldehyde moieties thereon.

Embodiment 65 provides the method of any one of Embodiments 62-64, wherein the crosslinker is at least one of a poly$((C_1-C_{10})$alkanylene) polymer or copolymer and a poly$((C_1-C_{10})$alkanyleneoxide) or copolymer, wherein at each occurrence the $(C_1-C_{10})$alkenylene is independently substituted or unsubstituted, wherein the polymer includes at least one aldehyde moiety thereon.

Embodiment 66 provides the method of any one of Embodiments 62-65, wherein the crosslinker is at least one of H—C(O)—$(C_0-C_{50})$alkyl-C(O)—H and H—C(O)—$(C_0-C_{50})$alkyl.

Embodiment 67 provides the method of any one of Embodiments 62-66, wherein the crosslinker is at least one of formaldehyde, ethanal, propanal, butanal, pentanal, hexanal, heptanal, octanal, nonanal, decanal, oxalaldehyde, malonaldehyde, succinaldehyde, glutaraldehyde, adipaldehyde, heptanedial, octanedial, nonanedial, decanedial, acetaldehyde, propionaldehyde, glycolaldehyde, glyoxalic acid, glyoxal, and paraformaldehyde.

Embodiment 68 provides the method of any one of Embodiments 62-67, wherein the aldehyde-forming compound is at least one of tri(methylol)melamine, hexa(methylol)melamine, tri$((C_1-C_3)$alkoxymethyl)melamine, and hexa$((C_1-C_3)$alkoxymethyl)melamine.

Embodiment 69 provides the method of any one of Embodiments 62-68, wherein the epihalohydrin is at least one of epibromohydrin and epichlorohydrin, and is unsubstituted or substituted.

Embodiment 70 provides the method of Embodiment 69, wherein the epihalohydrin is substituted with at least one $(C_1-C_3)$alkyl group.

Embodiment 71 provides the method of any one of Embodiments 62-70, wherein the epihalohydrin is epichlorohydrin.

Embodiment 72 provides the method of any one of Embodiments 62-71, wherein the crosslinker is at least one of phthalic anhydride, formic anhydride, acetic anhydride, maleic anhydride, acetic formic anhydride, a $(C_1-C_{20})$alkanoic $(C_1-C_{20})$alkanoic anhydride, propanoic acid anhydride, butanoic acid anhydride, pentanoic acid anhydride, hexanoic acid anhydride, octanoic acid anhydride, nonanoic acid anhydride, decanoic acid anhydride, salicylic acid anhydride, acrylic acid anhydride, aspartic acid anhydride, fumaric acid anhydride, methacrylic acid anhydride, hydroxypropyl acrylic acid anhydride, vinyl phosphonic acid anhydride, vinylidene diphosphonic acid anhydride, maleic anhydride, itaconic acid anhydride, crotonic acid anhydride, maleic acid anhydride, mesoconic acid anhydride, citraconic acid anhydride, styrene sulfonic acid anhydride, allyl sulfonic acid anhydride, methallyl sulfonic acid anhydride, and vinyl sulfonic acid anhydride.

Embodiment 73 provides the method of any one of Embodiments 62-72, wherein the crosslinker is at least one of poly(lactic acid), polyglycolide, polycaprolactone, polyhydroxyalkanoate, polyhydroxybutyrate, polyethylene adipate, polybutylene succinate, poly(3-hydroxybutyrate-co-3-hydroxyvalerate), poly(maleic anhydride), or a substituted or unsubstituted $(C_1-C_{20})$hydrocarbyl ester of at least one of a poly(substituted or unsubstitued $(C_1-C_{20})$alkenoic acid), a substituted or unsubstituted $(C_1-C_{20})$alkenoic acid-substituted or unsubstituted $(C_1-C_{20})$alkenoic acid copolymer, poly(acrylic acid), poly(methacrylic acid), polyglycolic acid, poly(aspartic acid), poly(fumaric acid), poly(hydroxypropyl acrylic acid), poly(vinyl phosphonic acid), poly(vinylidene diphosphonic acid), poly(itaconic acid), poly(crotonic acid), poly(maleic acid), poly(mesoconic acid), poly (citraconic acid), poly(styrene sulfonic acid), poly(allyl sulfonic acid), poly(methallyl sulfonic acid), vinyl sulfonic acid, acrylic acid-hydroxypropyl acrylate copolymer, hydrolyzed poly(maleic anhydride), maleic acid-acrylic acid copolymer, acrylic acid-2-acrylamino-2-methylpropanesulfonic acid copolymer, and a copolymer thereof.

Embodiment 74 provides the method of any one of Embodiments 1-73, wherein the crosslinked poly(vinyl alcohol), and a crosslinked poly(vinyl alcohol) copolymer is crosslinked with at least one of epichlorohydrin, formaldehyde, and paraformaldehyde.

Embodiment 75 provides the method of any one of Embodiments 1-74, wherein the crosslinked poly(vinyl alcohol) copolymer is crosslinked via at least one of di- and poly-alkenyl containing monomers used to synthesize the poly(vinyl alcohol) copolymer.

Embodiment 76 provides the method of any one of Embodiments 1-75, wherein the crosslinked poly(vinyl alcohol) copolymer is crosslinked via at least one monomer selected from the group consisting of methylenebisacrylamide, pentaerythritol allyl ether, and divinylbenzene.

Embodiment 77 provides the method of any one of Embodiments 1-76, wherein poly(vinyl alcohol) copolymer or crosslinked poly(vinyl alcohol) copolymer is at least one of a graft, linear, branched, block, and random copolymer of vinyl alcohol and a substituted or unsubstituted $(C_1-C_{20})$hydrocarbylene interrupted or terminated with 0, 1, 2, or 3 O, NH, or S, the $(C_1-C_{20})$hydrocarbylene being substituted with two substituted or unsubstituted $(C_2-C_5)$alkenyl groups.

Embodiment 78 provides the method of any one of Embodiments 1-77, further comprising crosslinking at least one of a poly(vinyl alcohol) and a poly(vinyl alcohol) copolymer to form at least one of the crosslinked poly(vinyl alcohol) and the crosslinked poly(vinyl alcohol) copolymer.

Embodiment 79 provides the method of Embodiment 78, wherein the crosslinking occurs above-surface.

Embodiment 80 provides the method of any one of Embodiments 78-79, wherein the crosslinking occurs downhole.

Embodiment 81 provides the method of any one of Embodiments 78-80, wherein the crosslinking occurs before the placement of the drilling fluid composition in the subterranean formation.

Embodiment 82 provides the method of any one of Embodiments 78-81, wherein the crosslinking occurs at least one of during and after the placement of the drilling fluid composition in the subterranean formation.

Embodiment 83 provides the method of any one of Embodiments 1-82, wherein poly(vinyl alcohol) copolymer or crosslinked poly(vinyl alcohol) copolymer is at least one of a graft, linear, branched, block, and random copolymer of vinyl alcohol and at least one of a substituted or unsubstitued $(C_2-C_{50})$hydrocarbyl having at least one aliphatic unsaturated C—C bond therein, and a substituted or unsubstituted $(C_2-C_{50})$alkene.

Embodiment 84 provides the method of any one of Embodiments 1-83, wherein poly(vinyl alcohol) copolymer or crosslinked poly(vinyl alcohol) copolymer is at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof.

Embodiment 85 provides the method of any one of Embodiments 1-84, wherein poly(vinyl alcohol) copolymer or crosslinked poly(vinyl alcohol) copolymer is at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle.

Embodiment 86 provides the method of any one of Embodiments 1-85, wherein the poly(vinyl alcohol) copolymer or the crosslinked poly(vinyl alcohol) copolymer is at least one of a graft, linear, branched, block, and random copolymer that comprises a poly(vinyl alcohol)-poly(acrylamide) copolymer, a poly(vinyl alcohol)-poly(2-acrylamido-2-methylpropanesulfonic acid) copolymer, a poly(vinyl alcohol)-poly(N-vinylpyrrolidone) copolymer, a poly(vinyl alcohol)-poly(methylenebisacrylamide) copolymer, a poly(vinyl alcohol)-poly(pentaerythritol ally ether) copolymer, or a poly(vinyl alcohol)-poly(divinylbenzene) copolymer.

Embodiment 87 provides the method of any one of Embodiments 1-86, wherein the poly(vinyl alcohol) copolymer, the crosslinked poly(vinyl alcohol), or the crosslinked poly(vinyl alcohol) copolymer comprises repeating units having a chemical structure of Structure I:

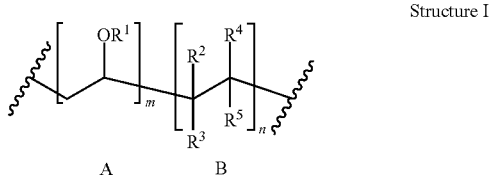

Structure I wherein repeating units A and B are in a block or random copolymer arrangement, wherein at each occurrence $R^1$ is independently selected from the group consisting of —H, CL, and $R^6$;

at each occurrence $R^6$ is independently selected from the group consisting of ($C_1$-$C_{10}$)hydrocarbyl and poly(($C_1$-$C_{10}$)hydrocarbylene) wherein at each occurrence the hydrocarbyl and the hydrocarbylene are each independently substituted or unsubstituted and are each independently interrupted or terminated by 0, 1, 2, or 3 of at least one of —O—, —NH—, —$NR^6$—, and —S—;

at each occurrence $R^2$, $R^3$, $R^4$, and $R^5$ are each independently selected from the group consisting of —H, OH, and —$R^6$, wherein at each occurrence $R^2$, $R^3$, $R^4$, and $R^5$ are independently optionally substituted with at least one —O—CL group, wherein at each occurrence $R^2$, $R^3$, $R^4$, and $R^5$ are independently optionally bonded to a carbon atom of at least one repeating unit of the same or another poly(vinyl alcohol) copolymer or crosslinked poly(vinyl alcohol);

at each occurrence, CL is a crosslinking group that crosslinks to at least one oxygen atom of at least one vinyl alcohol-unit of the same or another poly(vinyl alcohol) copolymer, crosslinked poly(vinyl alcohol), and crosslinked poly(vinyl alcohol) copolymer comprising repeating units having a chemical structure of Structure I;

m is 1 to 200,000; and n is 0 to 200,000.

Embodiment 88 provides the method of Embodiment 87, wherein at each occurrence CL is independently selected from the group consisting of —($C_1$-$C_{50}$)hydrocarbylene-, -poly(($C_1$-$C_{10}$)hydrocarbylene)-, —Mg—,

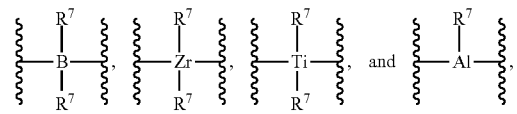

wherein at each occurrence the hydrocarbylene is independently substituted or unsubstituted and is interrupted or terminated by 0, 1, 2, or 3 of at least one of —O—, —NH—, —$NR^6$—, and —S—, and wherein at each occurrence $R^7$ is independently selected from the group consisting of $R^6$, —OH, and —O—CL.

Embodiment 89 provides the method of any one of Embodiments 87-88, wherein the poly(vinyl alcohol) copolymer comprises repeating units having a chemical structure of Structure I wherein at each occurrence $R^1$ is selected from the group consisting of —H and —C(O)—$CH_3$.

Embodiment 90 provides the method of any one of Embodiments 87-89, wherein the crosslinked poly(vinyl alcohol) comprises repeating units having a chemical structure of Structure I wherein n is 0, and wherein at least one $R^1$ in the structure is CL.

Embodiment 91 provides the method of any one of Embodiments 87-90, wherein the crosslinked poly(vinyl alcohol) comprises repeating units having a chemical structure:

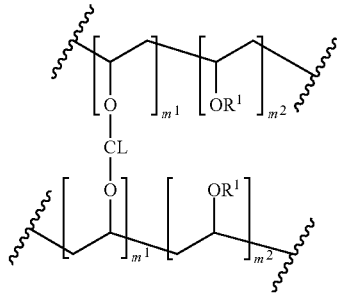

wherein $m^1+m^2=m$.

Embodiment 92 provides the method of any one of Embodiments 87-91, wherein the crosslinked poly(vinyl alcohol) copolymer comprises repeating units having a chemical structure of Structure I wherein n is at least 1, and wherein at least one $R^1$ in the structure is CL.

Embodiment 93 provides the method of any one of Embodiments 87-92, wherein the crosslinked poly(vinyl alcohol) copolymer comprises repeating units having a chemical structure:

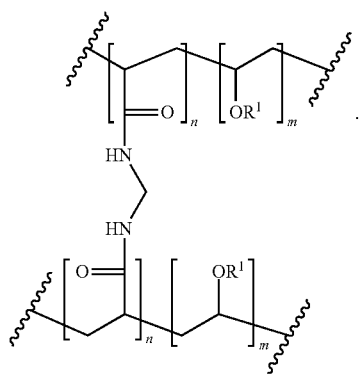

Embodiment 94 provides the method of any one of Embodiments 87-93, wherein the crosslinked poly(vinyl alcohol) copolymer comprises repeating units having a chemical structure:

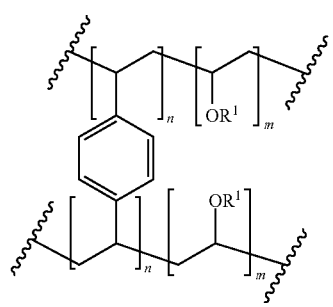

Embodiment 95 provides the method of any one of Embodiments 87-94, wherein the crosslinked poly(vinyl alcohol) copolymer comprises repeating units having a chemical structure:

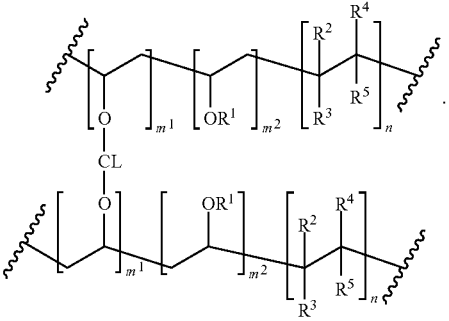

Embodiment 96 provides the method of any one of Embodiments 87-95, wherein about 0.1 mol % to about 99 mol % of vinyl alcohol units have $R^1$=CL.

Embodiment 97 provides the method of any one of Embodiments 87-96, wherein about 3 mol % to about 70 mol % of vinyl alcohol units have $R^1$=CL.

Embodiment 98 provides the method of any one of Embodiments 87-97, wherein at each occurrence $R^2$, $R^3$, $R^4$, and $R^5$ are each independently selected from —H, —OH, and substituted or unsubstituted $(C_1$-$C_{10})$hydrocarbyl.

Embodiment 99 provides the method of any one of Embodiments 87-98, wherein at each occurrence $R^2$, $R^3$, $R^4$, and $R^5$ are each independently selected from —H, —OH, and substituted or unsubstituted $(C_1$-$C_5)$alkyl.

Embodiment 100 provides the method of any one of Embodiments 87-99, wherein $R^2$ and $R^5$ are —H.

Embodiment 101 provides the method of any one of Embodiments 87-100, wherein $R^2$ and $R^5$ are —H, $R^3$ is —H, and $R^4$ is —C(O)—$NH_2$.

Embodiment 102 provides the method of any one of Embodiments 87-101, wherein the poly(vinyl alcohol) copolymer or crosslinked poly(vinyl alcohol) copolymer comprises repeating units having a chemical structure:

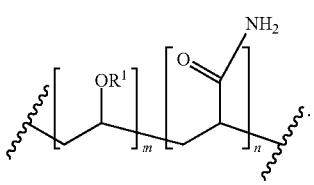

Embodiment 103 provides the method of any one of Embodiments 87-102, wherein $R^2$, $R^3$, and $R^5$ are —H, and $R^4$ is —C(O)—NH—C$(CH_3)_2$—$CH_2$—S(O)(O)OH.

Embodiment 104 provides the method of any one of Embodiments 87-103, wherein the poly(vinyl alcohol) copolymer or crosslinked poly(vinyl alcohol) copolymer comprises repeating units having a chemical structure:

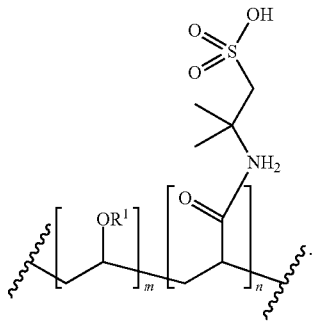

Embodiment 105 provides the method of any one of Embodiments 87-104, wherein $R^2$, $R^3$, and $R^5$ are —H, and $R^4$ is 2-pyrrolidone bound via the N.

Embodiment 106 provides the method of any one of Embodiments 87-105, wherein the poly(vinyl alcohol) copolymer or crosslinked poly(vinyl alcohol) copolymer comprises repeating units having a chemical structure:

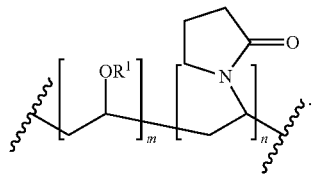

Embodiment 107 provides the method of any one of Embodiments 87-106, wherein the poly(vinyl alcohol) copolymer has a molecular weight of about 5,000 mol/g to about 500,000 mol/g.

Embodiment 108 provides the method of any one of Embodiments 87-107, wherein the crosslinked poly(vinyl alcohol) or the crosslinked poly(vinyl alcohol) copolymer has a molecular weight of about 5,000 mol/g to about 50,000,000 mol/g.

Embodiment 109 provides the method of any one of Embodiments 87-108, wherein CL is selected from the group consisting of $(C_1-C_{50})$hydrocarbylene and —C(O)—$(C_1-C_{50})$hydrocarbylene-C(O)—, wherein $(C_1-C_{20})$hydrocarbylene is substituted or unsubstituted and is optionally interrupted or terminated by 1, 2, or 3 O atoms.

Embodiment 110 provides the method of any one of Embodiments 87-109, wherein CL is selected from the group consisting of $(C_1-C_{20})$alkylene and —C(O)—$(C_1-C_{20})$alkylene-C(O)—, wherein $(C_1-C_{20})$alkylene is optionally interrupted or terminated by 1, 2, or 3 O atoms.

Embodiment 111 provides the method of any one of Embodiments 87-110, wherein CL is derived from crosslinking the poly(vinyl alcohol) or poly(vinyl alcohol) copolymer with a crosslinker that is at least one of epichlorohydrin, formaldehyde, and paraformaldehyde.

Embodiment 112 provides the method of any one of Embodiments 87-111, wherein CL is derived from crosslinking the poly(vinyl alcohol) or poly(vinyl alcohol) copolymer using a crosslinker comprising at least one of chromium, aluminum, antimony, zirconium, titanium, calcium, boron, iron, silicon, copper, zinc, magnesium, and an ion thereof.

Embodiment 113 provides the method of any one of Embodiments 87-112, wherein CL is derived from crosslinking the poly(vinyl alcohol) or poly(vinyl alcohol) copolymer with a crosslinker comprising at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

Embodiment 114 provides the method of any one of Embodiments 1-113, wherein the drilling fluid composition comprises a crosslinked gel or a crosslinkable gel.

Embodiment 115 provides the method of Embodiment 114, wherein the crosslinked gel or crosslinkable gel comprises at least one of a linear polysaccharide, and poly($(C_2-C_{10})$alkenylene), wherein the $(C_2-C_{10})$alkenylene is substituted or unsubstituted, Embodiment 116 provides the method of any one of Embodiments 114-115, wherein the crosslinked gel or crosslinkable gel comprises at least one of poly(acrylic acid) or $(C_1-C_5)$alkyl esters thereof, poly(methacrylic acid) or $(C_1-C_5)$alkyl esters thereof, poly(vinyl acetate), poly(vinyl alcohol), poly(ethylene glycol), poly(vinyl pyrrolidone), polyacrylamide, poly(hydroxyethyl methacrylate), acetan, alginate, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar, gum ghatti, gum arabic, locust bean gum, cellulose, derivatized cellulose, carboxymethyl cellulose, hydroxyethyl cellulose, carboxymethyl hydroxyethyl cellulose, hydroxypropyl cellulose, methyl hydroxy ethyl cellulose, guar, hydroxypropyl guar, carboxy methyl guar, and carboxymethyl hydroxylpropyl guar.

Embodiment 117 provides the method of any one of Embodiments 1-116, wherein the drilling fluid composition comprises at least one of chromium, aluminum, antimony, zirconium, titanium, calcium, boron, iron, silicon, copper, zinc, magnesium, and an ion thereof.

Embodiment 118 provides the method of Embodiment 117, wherein the drilling fluid composition comprises at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, or aluminum citrate.

Embodiment 119 provides the method of any one of Embodiments 1-118, wherein at least one of prior to, during, and after the placing of the drilling fluid composition in the subterranean formation, the drilling fluid composition is used downhole, at least one of alone and in combination with other materials, as a drilling fluid.

Embodiment 120 provides the method of any one of Embodiments 1-119, wherein the drilling fluid composition further comprises water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof.

Embodiment 121 provides the method of any one of Embodiments 1-120, wherein the drilling fluid composition comprises a payload material.

Embodiment 122 provides the method of any one of Embodiments 121, further comprising using the drilling fluid composition to deposit at least part of the payload material downhole.

Embodiment 123 provides the method of Embodiment 122, wherein the at least part of the payload material is deposited in a subterranean fracture.

Embodiment 124 provides the method of any one of Embodiments 121-123, wherein the payload material comprises a proppant, a resin-coated proppant, a curable material, an encapsulated resin, a resin, a Portland cement, a pozzolana cement, a gypsum cement, a high alumina content cement, a slag cement, a silica cement, a cementitious kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Embodiment 125 provides the method of any one of embodiments 1-124, wherein the placing of the drilling fluid composition in the subterranean formation downhole comprises pumping the drilling fluid composition through a drill string disposed in a wellbore, through a drill bit at a downhole end of the drill string, and back above-surface through an annulus.

Embodiment 126 provides the method of embodiment 125, further comprising processing the drilling fluid composition exiting the annulus with at least one fluid processing unit to generate a cleaned drilling fluid composition and recirculating the cleaned drilling fluid composition through the wellbore.

Embodiment 127 provides a method of treating a subterranean formation, the method comprising:

obtaining or providing a drilling fluid composition comprising a viscosifier comprising at least one of a poly(vinyl alcohol) copolymer, a crosslinked poly(vinyl alcohol), and a crosslinked poly(vinyl alcohol) copolymer;

wherein the drilling fluid composition is substantially free of a material that is at least one of kaolinite, halloysite, montmorillonite, illite, attapulgite, sepiolite, bentonite, hydrates thereof, and mixtures thereof, the material being substantially insoluble in the drilling composition, and the material substantially having a particle size smaller than 20 mesh and larger than 325 mesh, and wherein the drilling fluid is substantially free of Al(O)OH and hydrates thereof; and placing the drilling fluid composition in a subterranean formation downhole.

Embodiment 128 provides the method of Embodiment 127, wherein the drilling fluid composition is substantially free of kaolinite, halloysite, montmorillonite, illite, attapulgite, sepiolite, bentonite, and hydrates thereof.

Embodiment 129 provides the method of any one of Embodiments 127-128, wherein the drilling fluid composition is substantially free of silicate compounds.

Embodiment 130 provides the method of any one of Embodiments 127-129, wherein the drilling fluid composition is substantially free of aluminosilicate compounds.

Embodiment 131 provides the method of any one of Embodiments 127-130, wherein the drilling fluid composition is substantially free of Al(O)OH and hydrates thereof.

Embodiment 132 provides the method of any one of Embodiments 127-131, wherein the drilling fluid composition is substantially free of $Al(OH)_3$ and hydrates thereof.

Embodiment 133 provides the method of any one of Embodiments 127-132, wherein the drilling fluid composition is substantially free of hydroxyl-substituted aluminum compounds and salts thereof.

Embodiment 134 provides the method of any one of Embodiments 127-133, wherein the drilling fluid composition is substantially free of alumina.

Embodiment 135 provides a method of treating a subterranean formation, the method comprising: obtaining or providing a drilling fluid composition comprising a viscosifier comprising at least one of a crosslinked poly(vinyl alcohol), and a crosslinked poly(vinyl alcohol) copolymer, wherein the crosslinked poly(vinyl alcohol) copolymer is at least one of a graft, linear, branched, block, and random copolymer that is a poly(vinyl alcohol)-poly(acrylamide) copolymer, a poly(vinyl alcohol)-poly(2-acrylamido-2-methylpropanesulfonic acid) copolymer, a poly(vinyl alcohol)-poly(N-vinylpyrrolidone) copolymer, a poly(vinyl alcohol)-poly(methylenebisacrylamide) copolymer, a poly(vinyl alcohol)-poly(pentaerythritol allyl ether) copolymer, or a poly(vinyl alcohol)-poly(divinylbenzene) copolymer; and placing the drilling fluid composition in a subterranean formation downhole. In some embodiments, Embodiment 135 provides a system comprising: a drilling fluid composition comprising a viscosifier comprising at least one of a poly(vinyl alcohol) copolymer, a crosslinked poly(vinyl alcohol), and a crosslinked poly(vinyl alcohol) copolymer; and a subterranean formation comprising the drilling fluid composition therein.

Embodiment 136 provides the system of embodiments 135, further comprising a drill string disposed in a wellbore, the drill string comprising a drill bit at a downhole end of the drill string;

an annulus between the drill string and the wellbore; and a pump configured to circulate the drilling fluid composition through the drill string, through the drill bit, and back above-surface through the annulus.

Embodiment 137 provides the system of embodiment 136, further comprising a fluid processing unit configured to process the drilling fluid composition exiting the annulus to generate a cleaned drilling fluid composition for recirculation through the wellbore.

Embodiment 138 provides a drilling fluid composition for treatment of a subterranean formation, the composition comprising: a viscosifier comprising at least one of a poly(vinyl alcohol) copolymer, a crosslinked poly(vinyl alcohol), and a crosslinked poly(vinyl alcohol) copolymer.

Embodiment 139 provides a method of preparing a drilling fluid composition for treatment of a subterranean formation, the method comprising: forming a drilling fluid composition comprising a viscosifier comprising at least one of a poly(vinyl alcohol) copolymer, a crosslinked poly(vinyl alcohol), and a crosslinked poly(vinyl alcohol) copolymer.

Embodiment 140 provides the apparatus, method, or system of any one or any combination of Embodiments 1-139 optionally configured such that all elements or options recited are available to use or select from.

What is claimed is:

1. A method of treating a subterranean formation, the method comprising:
    providing a viscosifier, wherein the viscosifier comprises a crosslinked poly(vinyl alcohol) or a crosslinked poly(vinyl alcohol) copolymer, wherein the crosslinked poly(vinyl alcohol), or the crosslinked poly(vinyl alcohol) copolymer comprises repeating units having a chemical structure of Structure I:

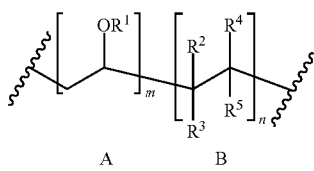

Structure I wherein repeating units A and B are in a block or random copolymer arrangement, wherein at each occurrence $R^1$ is independently selected from the group consisting of —H, CL, and $R^6$;
    at each occurrence $R^6$ is independently selected from the group consisting of $(C_1-C_{10})$hydrocarbyl and poly($(C_1-C_{10})$hydrocarbylene) wherein at each occurrence the hydrocarbyl and the hydrocarbylene are each independently substituted or unsubstituted and are each independently interrupted or terminated by 0, 1, 2, or 3 of at least one of —O—, —NH—, —$NR^6$—, and —S—;
    at each occurrence $R^2$, $R^3$, $R^4$, and $R^5$ are each independently selected from the group consisting of —H, OH, and —$R^6$, wherein at each occurrence $R^2$, $R^3$, $R^4$, and $R^5$ are independently optionally substituted with at least one —O—CL group, wherein at each occurrence $R^2$, $R^3$, $R^4$, and $R^5$ are independently optionally bonded to a carbon atom of at least one repeating unit of the same or another poly(vinyl alcohol) copolymer or crosslinked poly(vinyl alcohol);
    at each occurrence, CL is a crosslinking group that crosslinks to at least one oxygen atom of at least one vinyl alcohol-unit of the same or another poly(vinyl alcohol) copolymer, crosslinked poly(vinyl alcohol), and crosslinked poly(vinyl alcohol) copolymer comprising repeating units having a chemical structure of Structure L
    m is 1 to 200,000; and
    n is 0 to 200,000,
    and wherein the crosslinked poly(vinyl alcohol) or the crosslinked poly(vinyl alcohol) copolymer is crosslinked with epihalohydrin;
    combining the provided viscosifier with at least one fluid to prepare a drilling fluid composition; and
    placing the drilling fluid composition in the subterranean formation.

2. The method of claim 1, further comprising performing a subterranean drilling operation in the subterranean formation after placing the drilling fluid composition in the subterranean formation.

3. The method of claim 1, wherein the drilling fluid composition further comprises at least one of brine, sea water, brackish water, flow back water, production water, oil, and an organic solvent.

4. The method of claim 1, wherein the drilling fluid composition comprises an aqueous liquid comprising at least one salt, at least one ion, or a combination thereof, dissolved therein.

5. The method of claim 1, wherein at least about 90% of the drilling fluid composition is free of:
    a) kaolinite, halloysite, montmorillonite, illite, attapulgite, sepiolite, bentonite, hydrates thereof, and mixtures thereof;
    b) kaolinite, halloysite, montmorillonite, illite, attapulgite, sepiolite, bentonite, hydrates thereof, and mixtures thereof, substantially insoluble in the drilling fluid composition and substantially having a particle size smaller than No. 20 U.S. Standard Sieve Size and larger than No. 325 mesh U.S. Standard Sieve Size;
    c) silicate compounds;
    d) aluminosilicate compounds;
    e) Al(O)OH and hydrates thereof;
    f) Al(OH)$_3$ and hydrates thereof;
    g) hydroxyl-substituted aluminum compounds and salts thereof; and
    h) alumina.

6. The method of claim 1, wherein at least one of the crosslinked poly(vinyl alcohol) and the crosslinked poly(vinyl alcohol) copolymer is crosslinked with a crosslinker comprising at least one of chromium, aluminum, antimony, zirconium, titanium, calcium, boron, iron, silicon, copper, zinc, magnesium, and an ion thereof.

7. The method of claim 1, wherein the crosslinked poly(vinyl alcohol) copolymer is crosslinked via at least one of di- and poly-alkenyl containing monomers.

8. The method of claim 1, further comprising crosslinking at least one of a poly(vinyl alcohol) and a poly(vinyl alcohol) copolymer to form at least one of the crosslinked poly(vinyl alcohol) and the crosslinked poly(vinyl alcohol) copolymer.

9. The method of claim 1, wherein poly(vinyl alcohol) copolymer or crosslinked poly(vinyl alcohol) copolymer is at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene.

10. The method of claim 1, wherein at each occurrence CL is independently selected from the group consisting of —($C_1$-$C_{50}$)hydrocarbylene-, -poly((($C_1$-$C_{10}$)hydrocarbylene)-, —Mg—,

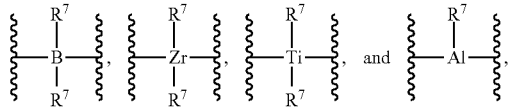

wherein at each occurrence the hydrocarbylene is independently substituted or unsubstituted and is interrupted or terminated by 0, 1, 2, or 3 of at least one of —O—, —NH—, —$NR^6$—, and —S—, and wherein at each occurrence $R^7$ is independently selected from the group consisting of $R^6$, —OH, and —O—CL.

11. The method of claim 1, wherein the crosslinked poly(vinyl alcohol) comprises repeating units having a chemical structure of Structure I wherein n is 0, and wherein at least one $R^1$ in the structure is CL.

12. The method of claim 1, wherein the crosslinked poly(vinyl alcohol) comprises repeating units having a chemical structure:

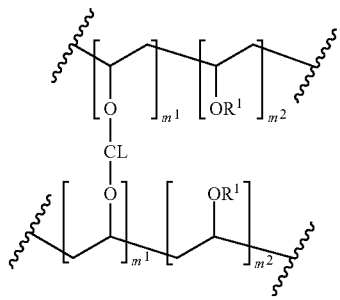

wherein $m^1+m^2=m$.

13. The method of claim 1, wherein the crosslinked poly(vinyl alcohol) copolymer comprises repeating units having a chemical structure of Structure I wherein n is at least 1, and wherein at least one $R^1$ in the structure is CL.

14. The method of claim 1, wherein the crosslinked poly(vinyl alcohol) copolymer comprises repeating units having a chemical structure:

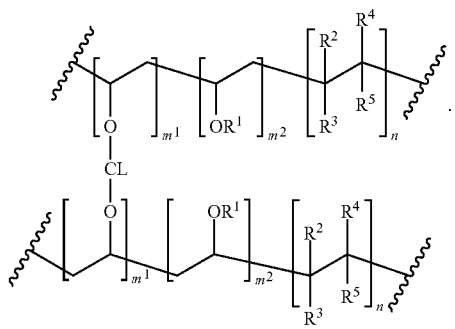

15. The method of claim 1, wherein about 0.1 mol % to about 99 mol % of vinyl alcohol units have $R^1$=CL.

16. A system for performing the method of claim 1, the system comprising:
a tubular disposed in the subterranean formation; and
a pump configured to pump the drilling fluid composition in the subterranean formation through the tubular.

17. The method of claim 1, wherein the drilling fluid composition comprises calcium chloride, sodium chloride, potassium chloride, magnesium chloride, calcium bromide, sodium bromide, potassium bromide, calcium nitrate, sodium formate, potassium formate, cesium formate, or a combination thereof.

18. A method of treating a subterranean formation, the method comprising:
providing a viscosifier, wherein the viscosifier comprises a crosslinked poly(vinyl alcohol) or a crosslinked poly (vinyl alcohol) copolymer, wherein the crosslinked poly(vinyl alcohol), or the crosslinked poly(vinyl alcohol) copolymer comprises repeating units having a chemical structure of Structure I:

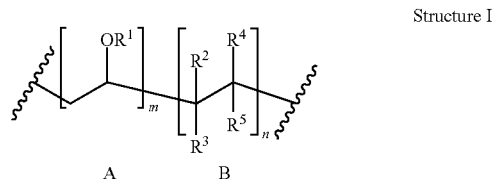

Structure I wherein repeating units A and B are in a block or random copolymer arrangement, wherein at each occurrence $R^1$ is independently selected from the group consisting of —H, CL, and $R^6$;
at each occurrence $R^6$ is independently selected from the group consisting of ($C_1$-$C_{10}$)hydrocarbyl and poly(($C_1$-$C_{10}$)hydrocarbylene) wherein at each occurrence the hydrocarbyl and the hydrocarbylene are each independently substituted or unsubstituted and are each independently interrupted or terminated by 0, 1, 2, or 3 of at least one of —O—, —NH—, —$NR^6$—, and —S—;
at each occurrence $R^2$, $R^3$, $R^4$, and $R^5$ are each independently selected from the group consisting of —H, OH, and —$R^6$, wherein at each occurrence $R^2$, $R^3$, $R^4$, and $R^5$ are independently optionally substituted with at least one —O—CL group, wherein at each occurrence $R^2$, $R^3$, $R^4$, and $R^5$ are independently optionally bonded to a carbon atom of at least one repeating unit of the same or another poly(vinyl alcohol) copolymer or crosslinked poly(vinyl alcohol);
at each occurrence, CL is a crosslinking group that crosslinks to at least one oxygen atom of at least one vinyl alcohol-unit of the same or another poly(vinyl alcohol) copolymer, crosslinked poly(vinyl alcohol), and crosslinked poly(vinyl alcohol) copolymer comprising repeating units having a chemical structure of Structure I;
m is 1 to 200,000; and
n is 0 to 200,000,
and wherein the crosslinked poly(vinyl alcohol) or the crosslinked poly(vinyl alcohol) copolymer is crosslinked with epihalohydrin;

combining the provided viscosifier with at least a fluid to prepare a drilling fluid composition, the drilling fluid composition comprising calcium chloride; and placing the drilling fluid composition in the subterranean formation, wherein at least about 90% of the drilling fluid composition is free of a material that is at least one of kaolinite, halloysite, montmorillonite, illite, attapulgite, sepiolite, bentonite, hydrates thereof, and mixtures thereof, the majority of the material being insoluble in the drilling composition, and a majority of the material having a particle size smaller than 20 mesh and larger than 325 mesh, and wherein a majority of the drilling fluid is free of Al(O)OH and hydrates thereof.

19. A method of treating a subterranean formation, the method comprising:

providing a viscosifier, wherein the viscosifier comprises a crosslinked poly(vinyl alcohol) or a crosslinked poly(vinyl alcohol) copolymer, wherein the crosslinked poly(vinyl alcohol), or the crosslinked poly(vinyl alcohol) copolymer comprises repeating units having a chemical structure of Structure I:

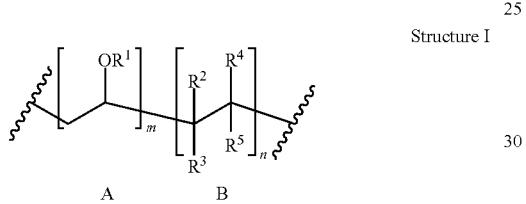

Structure I wherein repeating units A and B are in a block or random copolymer arrangement, wherein at each occurrence $R^1$ is independently selected from the group consisting of —H, CL, and $R^6$;

at each occurrence $R^6$ is independently selected from the group consisting of $(C_1-C_{10})$hydrocarbyl and poly$((C_1-C_{10})$hydrocarbylene) wherein at each occurrence the hydrocarbyl and the hydrocarbylene are each independently substituted or unsubstituted and are each independently interrupted or terminated by 0, 1, 2, or 3 of at least one of —O—, —NH—, —NR$^6$—, and —S—;

at each occurrence $R^2$, $R^3$, $R^4$, and $R^5$ are each independently selected from the group consisting of —H, OH, and —R$^6$, wherein at each occurrence $R^2$, $R^3$, $R^4$, and $R^5$ are independently optionally substituted with at least one —O—CL group, wherein at each occurrence $R^2$, $R^3$, $R^4$, and $R^5$ are independently optionally bonded to a carbon atom of at least one repeating unit of the same or another poly(vinyl alcohol) copolymer or crosslinked poly(vinyl alcohol);

at each occurrence, CL is a crosslinking group that crosslinks to at least one oxygen atom of at least one vinyl alcohol-unit of the same or another poly(vinyl alcohol) copolymer, crosslinked poly(vinyl alcohol), and crosslinked poly(vinyl alcohol) copolymer comprising repeating units having a chemical structure of Structure L m is 1 to 200,000; and n is 0 to 200,000, and wherein the crosslinked poly(vinyl alcohol) copolymer is at least one of a graft, linear, branched, block, and random copolymer that is a poly(vinyl alcohol)-poly(acrylamide) copolymer, a poly(vinyl alcohol)-poly(2-acrylamido-2-methylpropanesulfonic acid) copolymer, a poly(vinyl alcohol)-poly(N-vinylpyrrolidone) copolymer, a poly(vinyl alcohol)-poly(methylenebisacrylamide) copolymer, a poly(vinyl alcohol)-poly(pentaerythritol allyl ether) copolymer, or a poly(vinyl alcohol)-poly(divinylbenzene) copolymer, wherein the crosslinked poly(vinyl alcohol) or the crosslinked poly(vinyl alcohol) copolymer is crosslinked with epihalohydrin;

combining the provided viscosifier with at least a fluid to prepare a drilling fluid composition, the drilling fluid composition comprising calcium chloride or calcium bromide; and placing the drilling fluid composition in the subterranean formation.

* * * * *

UNITED STATES PATENT AND TRADEMARK OFFICE
CERTIFICATE OF CORRECTION

Page 1 of 1

PATENT NO. : 10,717,912 B2
APPLICATION NO. : 14/897780
DATED : July 21, 2020
INVENTOR(S) : Hui Zhou and Jay Paul Deville It is certified that error appears in the above-identified patent and that said Letters Patent is hereby corrected as shown below:

In the Claims

Column 42 Line 10, Claim 1 correct "Structure L" to --Structure I--.

Signed and Sealed this
Sixth Day of October, 2020

Andrei Iancu
*Director of the United States Patent and Trademark Office*